United States Patent
Schuppan et al.

(10) Patent No.: US 11,291,221 B2
(45) Date of Patent: Apr. 5, 2022

(54) METHODS FOR DETERMINATION OF BIOACTIVITY, QUANTITY, REMOVAL, OR INACTIVATION OF CEREAL AMYLASE TRYPSIN INHIBITORS IN CEREALS, FLOURS, PLANTS, AND COMPLEX FOODS

(71) Applicant: Beth Israel Deaconess Medical Center, Inc., Boston, MA (US)

(72) Inventors: Detlef Schuppan, Mainz (DE); Victor Zevallos, Mainz (DE)

(73) Assignee: Beth Israel Deaconess Medical Center, Inc., Boston, MA (US)

( * ) Notice: Subject to any disclaimer, the term of this patent is extended or adjusted under 35 U.S.C. 154(b) by 20 days.

(21) Appl. No.: 15/771,798

(22) PCT Filed: Oct. 28, 2016

(86) PCT No.: PCT/US2016/059473
§ 371 (c)(1),
(2) Date: Apr. 27, 2018

(87) PCT Pub. No.: WO2017/075456
PCT Pub. Date: May 4, 2017

(65) Prior Publication Data
US 2019/0098919 A1 Apr. 4, 2019

Related U.S. Application Data

(60) Provisional application No. 62/249,077, filed on Oct. 30, 2015.

(51) Int. Cl.
| | | |
|---|---|---|
| A23L 5/20 | (2016.01) | |
| A23L 7/104 | (2016.01) | |
| A21D 6/00 | (2006.01) | |
| A21D 13/066 | (2017.01) | |

(52) U.S. Cl.
CPC .............. *A23L 5/25* (2016.08); *A21D 6/00* (2013.01); *A21D 13/066* (2013.01); *A23L 5/20* (2016.08); *A23L 5/23* (2016.08); *A23L 7/107* (2016.08); *A23V 2002/00* (2013.01)

(58) Field of Classification Search
CPC ..... A23L 5/23; A23L 5/25; A23L 5/20; A23L 7/107; A21D 6/00; A21D 13/066; A23V 2002/00
USPC .......................................................... 426/7
See application file for complete search history.

(56) References Cited

U.S. PATENT DOCUMENTS

| | | | |
|---|---|---|---|
| 6,113,951 A | 9/2000 | Buchanan et al. | |
| 6,171,820 B1 | 1/2001 | Short | |
| 6,190,723 B1 | 2/2001 | Buchanan et al. | |
| 6,537,776 B1 | 3/2003 | Short | |
| 6,579,258 B1 | 6/2003 | Atkin et al. | |
| 2003/0135878 A1 | 7/2003 | Cho et al. | |
| 2003/0215542 A1* | 11/2003 | Buchanan | C07K 14/811 426/1 |
| 2006/0068406 A1 | 3/2006 | Affholter et al. | |
| 2013/0023649 A1 | 1/2013 | Keller et al. | |
| 2013/0266584 A1 | 10/2013 | Schuppan et al. | |

FOREIGN PATENT DOCUMENTS

| | | | |
|---|---|---|---|
| EP | 2373173 B1 | 10/2011 | |
| JP | 04182500 | * 6/1992 | ............... C12N 9/99 |
| JP | H04-182500 A | 6/1992 | |
| KR | 10-2012-0121717 A | 11/2012 | |
| WO | WO-93/08274 A1 | 4/1993 | |
| WO | WO-2011/137322 A2 | 11/2011 | |
| WO | WO-2011137322 A2 * | 11/2011 | ............. C07K 16/18 |
| WO | WO-2015/086735 A1 | 6/2015 | |
| WO | WO-2015/168416 A1 | 11/2015 | |

OTHER PUBLICATIONS

Junker, et al. J. Exper. Med. 209: 2395-2408 (2012) (Year: 2012).*
JP-04182500-English Abstract—pp. 12-14 (Year: 1992).*
International Search Report and Written Opinion for International Application No. PCT/US16/59473, dated Dec. 29, 2016 (15 pages).
Junker et al., "Wheat amylase trypsin inhibitors drive intestinal inflammation via activation of toll-like receptor 4," J Exp Med. 209(13):2395-408 (2012).
International Preliminary Report on Patentability for International Application No. PCT/US16/59473, dated May 11, 2018 (11 pages).
Granier, "Extraction of plant proteins for two-dimensional electrophoresis," Electrophoresis. 9(11):712-8 (1988).
International Preliminary Report on Patentability for International Application No. PCT/US15/28535, dated Nov. 8, 2016 (7 pages).
International Search Report and Written Opinion for International Application No. PCT/US15/28535, dated Sep. 29, 2015 (18 pages).
Invitation to Pay Additional Fees for International Application No. PCT/US15/28535, dated Jul. 21, 2015 (3 pages).
Prandi et al., "LC/MS analysis of proteolytic peptides in wheat extracts for determining the content of the allergen amylase/trypsin inhibitor CM3: influence of growing area and variety," Food Chem. 140(1-2):141-6 (2013).
Jänsch et al., "Glutathione reductase from Lactobacillus sanfranciscensis DSM20451T: contribution to oxygen tolerance and thiol exchange reactions in wheat sourdoughs," Appl Environ Microbiol. 73(14):4469-76 (2007).
Amano et al., "Identification of the major allergens in wheat flour responsible for baker's asthma," Biochem J. 330(Pt 3):1229-34 (1998).
Kusaba-Nakayama et al., "CM3, one of the wheat alpha-amylase inhibitor subunits, and binding of IgE in sera from Japanese with atopic dermatitis related to wheat," Food Chem Toxicol. 38(2-3):179-85 (2000).
Constantin et al., "Detection of antigens reactive to IgE and IgA during wheat seed maturation and in different wheat cultivars," Int Arch Allergy Immunol. 149(3):181-7 (2009).

(Continued)

*Primary Examiner* — Hamid R Badr
(74) *Attorney, Agent, or Firm* — Clark & Elbing LLP

(57) ABSTRACT

The present invention features methods of extracting amylase trypsin inhibitors (ATIs) from processed and unprocessed foodstuff, determining bioactivity of ATIs, quantifying the amount of ATIs in a foodstuff, and reducing the content of ATIs in a foodstuff.

21 Claims, 27 Drawing Sheets

(56) References Cited

OTHER PUBLICATIONS

Extended European Search Report for European Patent Application No. 16860944.4, dated May 29, 2019 (14 pages).
Tatham et al. "Allergens to wheat and related cereals," Clin Exp Allergy. 38(11):1712-1726 (2008).
Rekha et al., "Alpha-amylase inhibitor changes during processing of sweet potato and taro tubers," Plant Foods Hum Nutr. 57(3-4):285-94 (2002).
Huang et al., "Sourdough fermentation degrades wheat alpha-amylase/trypsin inhibitor (ATI) and reduces pro-inflammatory Activity," Foods. 9(7):943 (2020) (17 pages).
Carroccio et al., "Wheat Consumption Leads to Immune Activation and Symptom Worsening in Patients with Familial Mediterranean Fever: A Pilot Randomized Trial," Nutrients. 12(4):1127 (2020) (12 pages).
Caminero et al., "Lactobacilli Degrade Wheat Amylase Trypsin Inhibitors to Reduce Intestinal Dysfunction Induced by Immunogenic Wheat Proteins," *Gastroentrology*. 156(8): 2266-2280 (2019).
Ashfaq-Khan et al., "Dietary wheat amylase trypsin inhibitors promote features of murine non-alcoholic fatty liver disease," Sci Rep. 9(1):17463 (2019) (14 pages).
Pickert et al., "Wheat consumption aggravates colitis in mice via amylase trypsin inhibitor-mediated dysbiosis," Gastroenterology. 159:257-272 (2020) (33 pages).
Guilherme et al., "Dietary Wheat Amylase Trypsin Inhibitors Impact Alzheimer's Disease Pathology in 5xFAD Model Mice," Int J Mol Sci. 21(17):6288 (2020) (17 pages).
Zevallos et al., "Nutritional Wheat Amylase-Trypsin Inhibitors Promote Intestinal Inflammation via Activation of Myeloid Cells," Gastroenterology. 152(5):1100-1113 (2017) (26 pages).
Sielaff et al., "Hybrid QconCAT-Based Targeted Absolute and Data-Independent Acquisition-Based Label-Free Quantification Enables In-Depth Proteomic Characterization of Wheat Amylase/Trypsin Inhibitor Extracts," J Proteome Res. doi:10.1021/acs.jproteome.0c00752 (2021) (14 pages).

* cited by examiner

High: gluten containing

| | |
|---|---|
| Wheat | *Triticum* aestivum |
| Barley | *Hordeum vulgare* L. |
| Rye | *Secale cereale* |

Medium: gluten-free (gluten-poor)

| | |
|---|---|
| Soya | *Glycine Max* |
| Quinoa | *Chenopodium* quinoa |
| Buckwheat | *Fagopyrum esculentum* |
| Peas | *Pisum sativum* |
| Early Crops | *Einkorn<Emmer<Spelt* |

Low: gluten free

| | |
|---|---|
| Rice | *Oryza sativa* |
| Millet | *Panicum miliaceum* |
| Oats | *Avena sativa* |
| Maize | *Zea mays* L. |
| Amaranth | *Amaranthus caudatus* |

High: Gluten containing

Pizza

Pasta

Bread

Low: Gluten-free

Pizza gluten-free

Pasta gluten-free

Bread gluten-free

FIG. 10

METHODS FOR DETERMINATION OF BIOACTIVITY, QUANTITY, REMOVAL, OR INACTIVATION OF CEREAL AMYLASE TRYPSIN INHIBITORS IN CEREALS, FLOURS, PLANTS, AND COMPLEX FOODS

STATEMENT AS TO FEDERALLY FUNDED RESEARCH

This invention was made with government support under Grant No. AI078385 awarded by the National Institutes of Health. The government has certain rights in the invention.

BACKGROUND

Ingestion of wheat, barley, or rye triggers small intestinal inflammation in patients with celiac disease. Specifically, the storage proteins of these cereals (gluten) elicit an adaptive Th1-mediated immune response in individuals carrying HLA-DQ2 or HLA-DQ8 as a major genetic predisposition. This well-defined role of adaptive immunity contrasts with an ill defined component of innate immunity in celiac disease. We have identified the alpha-amylase/trypsin inhibitors (ATIs) CM3 and 0.19, pest resistance molecules in wheat and related cereals, as strong activators of innate immune responses in monocytes, macrophages, and dendritic cells. ATIs engage the TLR4-MD2-CD14 complex and lead to up-regulation of maturation markers. ATIs then elicit release of proinflammatory cytokines from cells inceliac and non-celiac patients. Mice deficient in TLR4 or TLR4 signaling are protected from intestinal and systemic immune responses upon oral challenge with ATIs. These findings define cereal ATIs as contributors to celiac disease. Moreover, and importantly, ATIs are strong nutritional candidates that exacerbate and thus may fuel inflammation and adverse immune reactions in other intestinal and non-intestinal immune disorders. In this vein, ATIs are the most likely triggers of non-celiac-non-allergy wheat sensitivity, currently a diagnosis of exclusion in the hands of experts, in which patients suffer from intestinal and/or intestinal diseases in tight association with the consumption of gluten containing foods. This condition may affect up to about 10% of most wheat consuming populations worldwide. Therefore, there exists a great need for novel technologies and methods that are able to remove ATI from foods and/or permit the production of foods that maintain the desired properties of gluten containing foods but are low in ATI-content and bioactivity. The development of such techniques is tightly linked to analytical methods to quantify ATI content and bioactivity in foods before and after processing for consumption.

SUMMARY OF THE INVENTION

The present invention features methods of extracting ATIs from processed and unprocessed foodstuff, determining bioactivity of ATIs, quantifying the amount of ATIs in a foodstuff, reducing the content of ATIs in a foodstuff, and supporting the production of a foodstuff with reduced ATI content.

In a first aspect, the invention features a method of reducing the ATI content of a foodstuff, wherein the method includes incubating the foodstuff in an extraction buffer for a duration sufficient to reduce the ATI content of the foodstuff by at least 50% followed by removing the extraction buffer from the foodstuff.

In some embodiments, the extraction buffer is a neutral, near neutral, or alkaline solvent or buffer. In some embodiments, the extract buffer is selected from the group consisting of PBS, Tris-buffer, water, and ammonium or sodium bicarbonate. In some embodiments, the extraction buffer contains salt (e.g., 0.1-1 M NaCl).

In some embodiments, the extract buffer further includes a detergent or detergent mixture. In some embodiments, the detergent or detergent mixture is selected from the group consisting of sodiumdodecyl sulfate, Triton X-100, Tween-20, and sodium deoxycholate.

In some embodiments, the extraction buffer further includes a reducing agent. In some embodiments, the reducing agent is selected from the group consisting of mercaptoethanol, dithioerythritol (DTT), cysteine, glutathione (GSH) balanced with oxidized glutathione (GSSG), sulfite, and thioredoxin.

In some embodiments, the extraction buffer further includes at least one protease and/or a synthetic enzyme engineered to reduce and/or degrade ATIs. Examples of synthetic enzyme engineered to reduce and/or degrade ATIs are described in detail further herein. In some embodiments, the protease is pepsin, trypsin, chymotrypsin, elastase, thermolysin, bromelain, papain, subtilisin, an alkaline protease, a neutral protease, an acidic protease, a fungal protease, a yeast protease, or a bacterial protease. In some embodiments, the alkaline protease is a serine protease.

In some embodiments, the extraction buffer further includes an alkylating agent. In some embodiments, the alkylating agent is iodoacetamide and the alkylating agent is further quenched by the addition of excess reducing agent.

For food technology, such as bulk preparation of ATI-deenriched flours, etc., the extracted foodstuff (e.g., dough) can be used directly after separation of supernatant, which contains the extracted ATIs. For example, wet doughs are often frozen and shipped to bakeries directly.

In some embodiments, the foodstuff is separated mechanically prior to incubation. In some embodiments, the mechanically separated foodstuff is dried prior to incubation.

In some embodiments, the drying is air-drying or freeze drying. In some embodiments, prior to the drying, the mechanically separated foodstuff is contacted with an aqueous solvent or an organic solvent having a lower boiling point than water. In some embodiments, the organic solvent is selected from the group consisting of acetone and ethanol.

In a second aspect, the invention features a method of extracting amylase trypsin inhibitors (ATIs) from a foodstuff, wherein the method includes A) incubating the foodstuff with an extraction buffer in a mixture; B) centrifuging the mixture to form a pellet and supernatant; C) drying the supernatant; and D) reconstituting the dried supernatant in a reconstitution buffer, wherein extracted ATIs are present in the reconstitution buffer.

In some embodiments, the foodstuff is unprocessed prior to extraction. In some embodiments, the foodstuff is a processed foodstuff. In some embodiments, the food stuff is gluten.

In some embodiments, prior to step A, the foodstuff is ground. In some embodiments, prior to step A, the foodstuff is defatted. In some embodiments, the defatting is performed by the incubation of the foodstuff with methanol/diethylether. In some embodiments, the methanol/diethyl ether is present at a 1:1 ratio. In some embodiments, the extraction buffer is ammonium or sodium bicarbonate, chloroform/methanol, or an acid. In some embodiments, the acid is acetic acid.

In some embodiments, the extraction buffer is at a concentration between 5 mM to 100 mM.

In some embodiments, the drying is freeze-drying or drying under a stream of gas, e.g., air.

In some embodiments, steps A-C are repeated prior to step D. In some embodiments, the extraction buffer in steps A-C is first chloroform/methanol and the extraction buffer is ammonium or sodium bicarbonate when steps A-C are repeated or wherein the extraction buffer is ammonium or sodium bicarbonate in both extractions.

In some embodiments, prior to step A, the foodstuff is digested with at least one protease and/or a synthetic enzyme engineered to reduce and/or degrade ATIs. In some embodiments, the protease is pepsin, trypsin, chymotrypsin, elastase, thermolysin, bromelain, papain, subtilisin, an alkaline protease, a neutral protease, an acidic protease, a fungal protease, a yeast protease, or a bacterial protease. In some embodiments, the alkaline protease is a serine protease.

In some embodiments, the foodstuff is first digested with pepsin followed by digestion with trypsin and/or chymotrypsin.

In some embodiments, after the foodstuff is digested with a protease, the foodstuff is centrifuged to form a supernatant and the supernatant is incubated with the extraction buffer of step A.

In some embodiments, the incubation is performed as a dialysis incubation, step B is omitted, and the supernatant, after dialysis is dried in step C.

In a third aspect, the invention features a method of determining the bioactivity of ATIs in a sample, wherein the method includes incubating ATI-reactive cells with an extract suspected of including ATIs and determining an ATI-response in the ATI-reactive cells, thereby determining the bioactivity of the ATIs in a sample.

In some embodiments, the extract suspected of including ATIs is prepared by the method described in the first and second aspects of the invention.

In some embodiments, the ATI-reactive cells express TLR4, TLR4-MD2, or TLR4-MD2-CD14 signaling complex. In some embodiments, the ATI-reactive cells are selected from the group consisting of monocytes/macrophages, dendritic cells, and cells transfected with a TLR4, TLR4-MD2, or TLR4-MD2-CD14 oligomeric signaling complex.

In some embodiments, the cells are stable cell lines, e.g., THP-1 and U937 cells. In some embodiments, the cells are cells (e.g., HeLa or HEK293 cells) transfected with TLR4-signaling complex.

In some embodiments, the determination of ATI-response includes quantification of one or more cytokines released by the cells. In some embodiments, the one or more cytokines are selected from the group consisting of, e.g., IL-8, IL-15, TNFα, CCL2 (MCP-1), and CCL5 (RANTES).

In some embodiments, the quantification of released chemokines and/or cytokines or related factors is performed by ELISA.

In some embodiments, the cell includes a reporter gene under the control of a TLR4 (ATI)-responsive promoter and the determination of an ATI-response includes detection of expression of the reporter gene. In some embodiments, the ATI-responsive promoter is the IL-8 promoter. In some embodiments, the reporter gene encodes a luminescent or fluorescent protein.

In some embodiments, the determination of ATI-response includes measuring a level of one or more RNAs in the cells associated with an ATI-response. In some embodiments, the one or more RNAs corresponds to those of chemokines, cytokines, Hsp27, Hsp70, and/or Hsp90.

In some embodiments, the determination of ATI-response includes detecting one or more activation markers on or in the cells. In some embodiments, the one or more activation markers is selected from the group consisting of CD80, CD86, MHC class II, IL-12, IL-23, and interferon gamma (release or intracellular stain).

In some embodiments, the detecting includes flow-cytometry.

In some embodiments, the determination of ATI-response includes detecting an alteration is a signaling pathway associated with an ATI response. In some embodiments, the alteration in a signaling pathway is detected based on the detection of IRF-3, NFkB (p65), or NFkB nuclear translocation.

In some embodiments, the determination of ATI-response includes contacting ovalbumin or gluten specific T cells in the presence of the sample suspected of containing ATIs and measuring the proliferation of the cells in the presence of ATI-reactive antigen presenting cells.

In a fourth aspect, the invention features a method of determining the bioactivity of ATIs in a sample, wherein the method includes A) incubating an immobilized TLR4, TLR4-MD2, or TLR4-MD2-CD14 with an extract suspected of including ATIs, wherein the immobilized TLR4, TLR4-MD2, or TLR4-MD2-CD14 is immobilized to a solid phase and bound to a labeled ATI, B) removing the extract, and C) determining the amount of labeled ATI in the extract or bound to said immobilized TLR4, TLR4-MD2, or TLR4-MD2-CD14 that is immobilized to the solid phase.

In some embodiments, the labeled ATI is labeled with a fluorophore. In some embodiments, the labeled ATI is labeled with an enzyme (e.g., horseradish peroxidase or alkaline phosphatase).

In a fifth aspect, the invention features a method of determining the bioactivity of ATIs in a sample, the method including A) incubating an immobilized TLR4, TLR4-MD2, or TLR4-MD2-CD14 with an extract suspected of including ATIs, B) removing the extract suspected of including ATIs, and C) determining the amount of ATIs that are bound to the immobilized TLR4 using an antibody in an ELISA.

In some embodiments, the antibody recognizes and binds to at least one ATI selected from the group consisting of CM3, CM2, 0.19, 0.28, and 0.53.

In a sixth aspect, the invention features a method of quantifying the amount of ATIs in a foodstuff, wherein the method includes A) incubating the foodstuff in an extraction buffer thereby forming an extract; B) optionally incubating the extract with an alkylating agent; C) optionally separating the ATIs from the extract; and D) quantifying the ATIs.

In some embodiments, the extraction buffer is a neutral, near neutral, or an alkaline solvent or buffer. In some embodiments, the extract buffer is selected from the group consisting of PBS, Tris-buffer, and ammonium or sodium bicarbonate.

In some embodiments, the extract buffer further includes a detergent or detergent mixture. In some embodiments, the detergent or detergent mixture is selected from the group consisting of sodium dodecyl sulfate, Triton X-100, Tween-20, and sodium deoxycholate.

In some embodiments, the extraction buffer further includes a reducing agent. In some embodiments, the reducing agent is selected from the group consisting of mercaptoethanol, dithioerythritol (DTT), cysteine, glutathione (GSH) balanced with oxidized glutathione (GSSG), sulfite, and thioredoxin.

In some embodiments, the extraction buffer further includes an alkylating agent. In some embodiments, the alkylating agent is iodoacetamide and the alkylating agent is further quenched by the addition of excess reducing agent.

In some embodiments, the method further includes adding at least one protease and/or a synthetic enzyme engineered to reduce and/or degrade ATIs to the extract. Examples of synthetic enzyme engineered to reduce and/or degrade ATIs are described in detail further herein. In some embodiments, the protease is pepsin, trypsin, chymotrypsin, elastase, thermolysin, bromelain, papain, subtilisin, an alkaline protease, a neutral protease, an acidic protease, a fungal protease, a yeast protease, or a bacterial protease. In some embodiments, the protease is pepsin.

In some embodiments, the ATIs are quantified by mass spectrometry, quantitative western blotting, or ELISA.

In some embodiments, an assay involving immobilized TLR4 (e.g., TLR4-MD2, TLR4-CD14, or TLR4-MD2-CD14) and labeled ATI may be used in methods of quantifying the amount of ATIs in a foodstuff and/or determining the bioactivity of ATIs in a foodstuff. In this assay, TLR4 is immobilized on a solid support (i.e., wells of a 96-well plate, or beads). Labeled ATIs (i.e., fluorophore labeled ATIs) are then added to the immobilized TLR4 (e.g., TLR4-MD2, TLR4-CD14, or TLR4-MD2-CD14) to form a complex of TLR4 (e.g., TLR4-MD2, TLR4-CD14, or TLR4-MD2-CD14)/labeled ATI in the wells of the 96-well plate. Further, a sample containing extracted ATIs from a foodstuff is added before, concomitantly, or afterwards to the wells of the 96-well plate containing the TLR4 (e.g., TLR4-MD2, TLR4-CD14, or TLR4-MD2-CD14)/labeled ATI complex. The extracted ATIs in the sample compete with the labeled ATIs in binding to the immobilized TLR4 (e.g., TLR4-MD2, TLR4-CD14, or TLR4-MD2-CD14). After incubating the sample containing extracted ATI with the TLR4 (e.g., TLR4-MD2, TLR4-CD14, or TLR4-MD2-CD14)/labeled ATI complex, the plate is washed to remove unbound labeled ATIs. The more extracted ATIs are in the sample, the more labeled ATIs are competed off the TLR4 (e.g., TLR4-MD2, TLR4-CD14, or TLR4-MD2-CD14)/labeled ATI complex and remain unbound. If the labeled ATIs are attached to specific fluorophores, the amount of fluorescent (luminescent) signal that remains bound to the solid support, or the amount of fluorescent signal (luminescent) in the wash may serve as an indication of the amount of extracted ATIs in the sample. In other embodiments, the labeled ATIs may be detected by a secondary agent (i.e., an antibody) that is coupled to an enzyme, i.e., horseradish peroxidase or alkaline phosphatase, or a fluorescent or luminescent protein, which produces a spectrometric signal upon reaction with its specific substrate. In some embodiments, the antibody recognizes and binds to at least one ATI selected from the group consisting of e.g. CM3, CM2, 0.19, 0.28, and 0.53.

In some embodiments, the measurements of ATI bioactivity can be replaced by the determination of the quantities of extracted ATIs by conventional ELISAs, such as sandwich ELISAs, or related assays. While this is state of the art technology, we demonstrated that once a selection of key or dominant native ATIs or certain ATI fragments are determined, their overall quantity correlates well with the measured bioactivity. In some embodiments, such ELISAs or related techniques recognize and bind to at least one ATI selected from the group consisting of, e.g., CM3, CM2, 0.19, 0.28, and 0.53.

The analytical methods to measure ATI-bioactivity/quantity are centrally linked to the selection and preparation of ATI-containing or ATI-de-enriched foodstuff. These analytic assays used to measure ATI-bioactivity/quantity help to produce foodstuffs in the needed quantities. An estimate is that the disease promoting effect of ATIs is abolished by reducing the average ATI consumption in wheat (e.g., barley, rye) based diets of 0.5-1.0 gram by approximately 90% (see, e.g., Catassi et al., Nutrients 7:4966-4977, 2015; Fasano et al., Gastroenterology 148:1195-1204, 2015; Schuppan et al., Best Practice & Research: Clinical Gastroenterology 29:469-76, 2015).

In a seventh aspect, the invention features a method of producing a foodstuff having a reduced ATI content or is free of ATIs, wherein the method includes A) determining the bioactivity of ATIs in the foodstuff, and/or B) quantifying the amount of ATIs in the foodstuff, and C) reducing the amount of ATIs in the foodstuff by extracting and degrading ATIs using one or more reducing agents, proteases, and/or synthetic enzymes engineered to reduce and/or degrade ATIs in the food stuff.

In a seventh aspect, the invention features a method of reducing the reactivity of a foodstuff, wherein the method includes cultivating a cereal with oxidized glutathione (GSSG) and/or protein bound, oxidized glutathione (PSSG). In some embodiment, the cereal is also cultivated with a balanced amount of reduced glutathione (GSH).

In an eighth aspect, the invention features a method of reducing the ATI/TLR4-reactivity of a foodstuff, wherein the method includes cultivating a cereal with sulfur rich or sulfur depleted fertilizers.

In a ninth aspect, the invention features a method of reducing the ATI content of a foodstuff, wherein the method includes fermenting the foodstuff with a bacteria with high disulfide reducing and/or proteolytic ability. In some embodiments, the bacteria is selected from the group consisting of *Lactobacillus* sanfranciscensis and *L. reuteri* LTH2584.

DESCRIPTION OF THE DRAWINGS

FIG. 10 shows a summary ATI bioactivity determinations from flours and baked foods. ATI content is usually low in most gluten free foods. Classification of grains and food products according to the amount of bioactive ATI (innate stimulating activity as determined by one of the bioassays). high: typical gluten containing cereals and products, medium: between about 5-20%, and low: below 5% of typical gluten containing cereals or foods.

DETAILED DESCRIPTION OF THE INVENTION

Amylase trypsin inhibitors (ATIs)

Figure 1A:
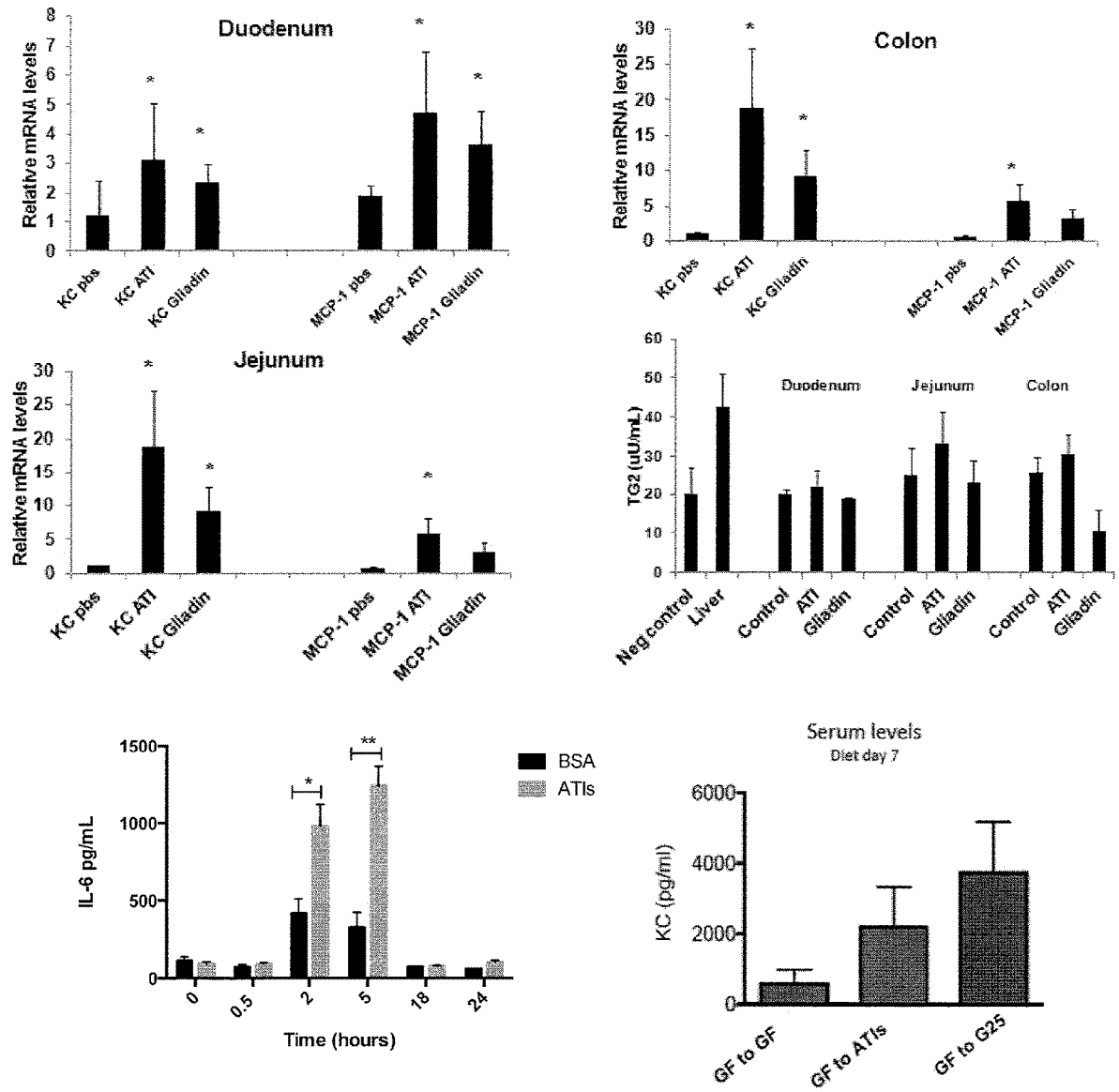
FIG. 1 shows the induction of low grade innate inflammation in the intestine of healthy C57BL6 mice at 12 hours after oral gavage of 200 μg of purified wheat ATIs in 200 μl PBS compared to PBS alone or 1 mg of crude Sigma gliadin (containing about 15% wt/wt of ATIs) in 200 μl PBS. Determination of inflammatory genes from the harvested intestine was performed using quantitataive RT-PCR normalized to GAPDH mRNA as housekeeping gene. ATIs caused also a mild upregulation of transglutaminase 2 (TG2) mRNA which is central to celiac disease pathogenesis. (A): Transcript levels of inflammatory markers (MCP-1=CCL2 and KC=IL-8) and of TG2 in the intestine were up-regulated after feeding a single dose of ATIs or ATI-containing gliadin (commercial product from Sigma, with about 15% wt/wt ATIs) to C57BL/6 mice kept on a gluten-free diet. n=5 per group; *p<0.05. Kinetics of serum IL-6 after one oral ATI vs BSA challenge, and serum IL-8 levels in mice changed from a gluten free diet composed of 20% casein as protein source with defined carbohydrates and fats to either a diet in which 1% wt/wt of the casein was replaced by ATIs (GF to ATI) or a diet in which 25% of the protein was replaced by gluten containing about 5% w/w of ATIs (GF to G25), vs mice continued on the GF diet (GF to GF) for 7 days. (B): F4-80 positive cells (macrophages, ×200) were higher in the group challenged with ATIs or ATI-containing gliadin. Macrophages show a dark colour (peroxidase-staining). Quantitative assessment counting positive cells in 4 high power fields per sample. n=5 per group.
Figure 1B:
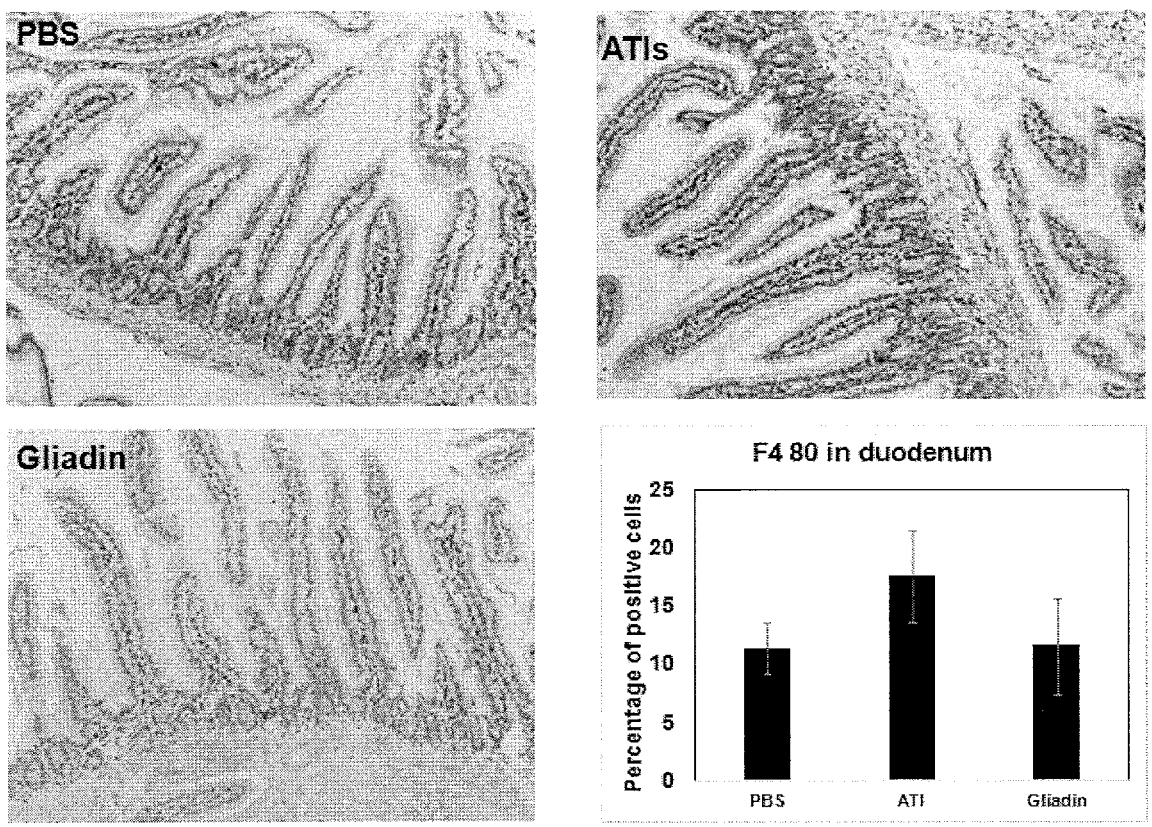
Figure 2:
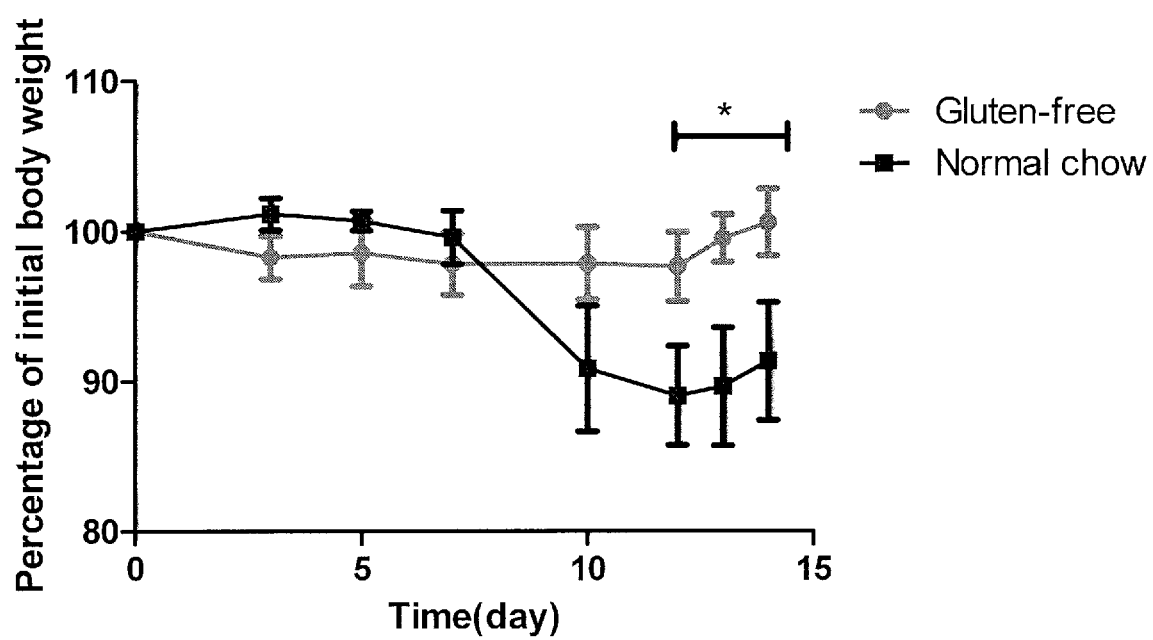
FIG. 2 shows that an ATI containing diet exacerbates inflammatory bowel disease. Dextran sodium sulfate (DSS) colitis (Lauroui et al., *PLoS One* 7:e32084, 2012; Wirtz et al. *Nat. Protoc.* 2:541-546, 2007) was induced by adding a low dose of 1.5% DSS (w/v) in the drinking water of female C57BL/6 mice on a gluten-free diet (GFD, purely casein-based protein source) or "normal" chow containing 25% of gluten (with about 15% w/w as ATIs)/75% casein as protein source. Mouse body weight changes that are strong indicators of the severity of colitis were recorded every two days (data by Dr. G. Pickert in the Ps group). Changes were significant from day 12 on ($p<0.05$ ATI-free vs. ATI-containing chow).
Figures 3A, 3B:
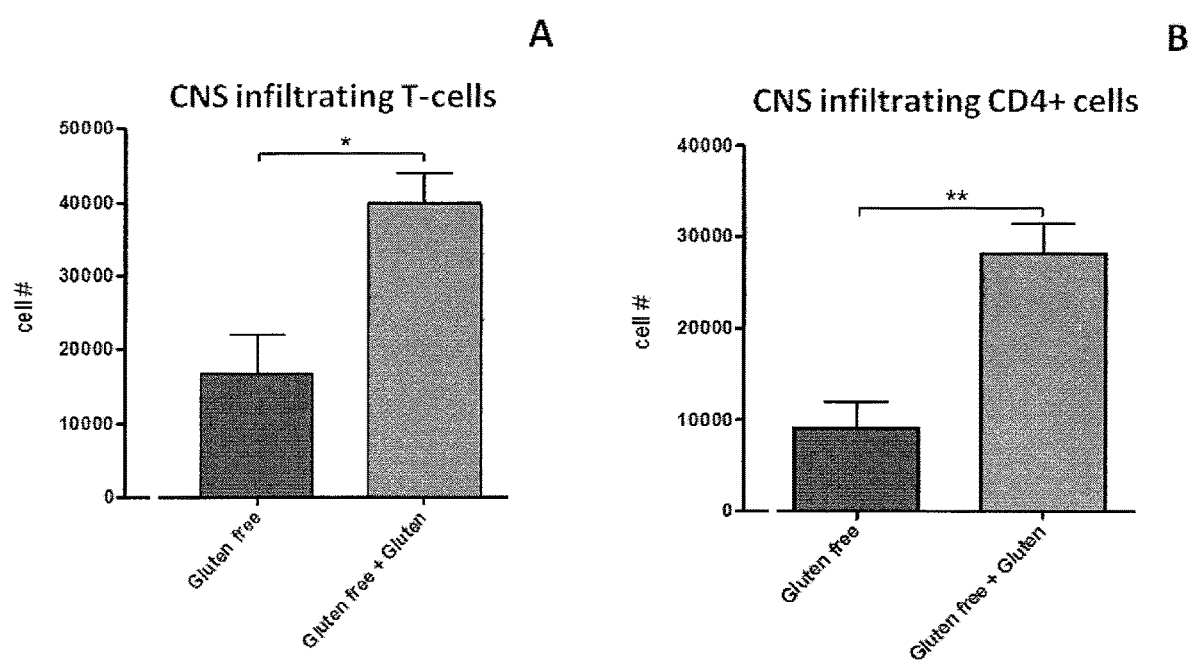
FIG. 3 shows that an ATI containing diet exacerbates experimental multiple sclerosis. (A-D): Experimental autoimmune encephalomyelitis (EAE), a suitable model of multiple sclerosis, was induced by immunization with myelin oligodendrocyte protein ($MOG_{35-55}$ peptide emulsified in complete Freund's adjuvant and pertussis toxin on the first day of immunization and 2 days later) in female C57BL/6 mice on a gluten-free diet (GFD, casein as protein source). Animals were divided in group 1 continuing on the GFD and group 2 changing to a diet containing 25% of gluten (with about 15% w/w as ATIs)/75% casein as protein source). CNS-infiltrating total T cell (A), CD4+(B) and CD8+(C) T cell numbers were calculated using FACS-analysis of extracted brain tissue (shown is a representative experiment of three independent experiments with n=4 mice per group). Mice were observed and scored daily for clinical signs of EAE after induction (days post induction, DPI) (D). Data are representative of three independent experiments (n=10 per group, maximal clinical score 3.75). *$p<0.05$ comparing both groups. (E): EAE-induction in female C57BL/6 mice on a gluten-free diet (GFD) as in FIG. 3A. Animals were divided in four groups: group 1 continued with the GFD (GF to GF), group 2 changed to a diet containing purified ATIs (GF to ATI; casein-based protein source with 1% purified ATIs), group 3 changed to a diet containing 25% gluten (about 15% w/w as ATIs) (GF to G), and group 4 changed to a diet containing 25% gluten with partial de-enrichment ATIs by extraction (reduction of ATI-content by about 70% (GF to G-ATI). Mice were observed and scored daily for clinical signs of EAE after induction (days post induction, DPI) (D). Data represents one independent experiment (n=10 per group, maximal clinical score: 2.5: incipient hindleg paralysis, see below). *$p<0.05$ for the area under curve from baseline to peak of disease for GF/GF vs GF/ATI. Clinical EAE score: 0, no disease; 1, decreased tail tone; 2, abnormal gait (ataxia) and/or impaired righting reflex (hind limb weakness or partial paralysis); 3, partial hind limb paralysis; 4, complete hind limb paralysis; 5, hind limb paralysis with partial fore limp paralysis; 6, moribund or dead.
Figure 3C:
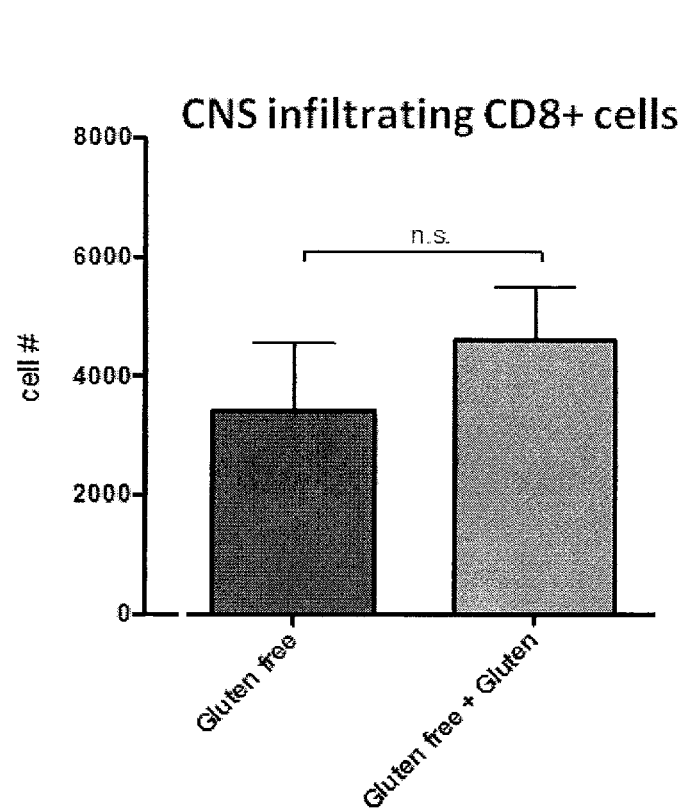
Figure 3D:
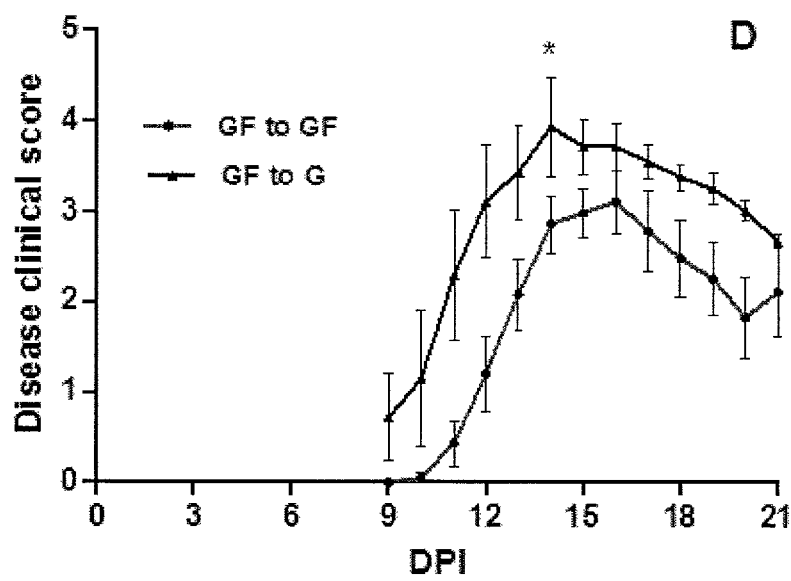
Figure 3E:
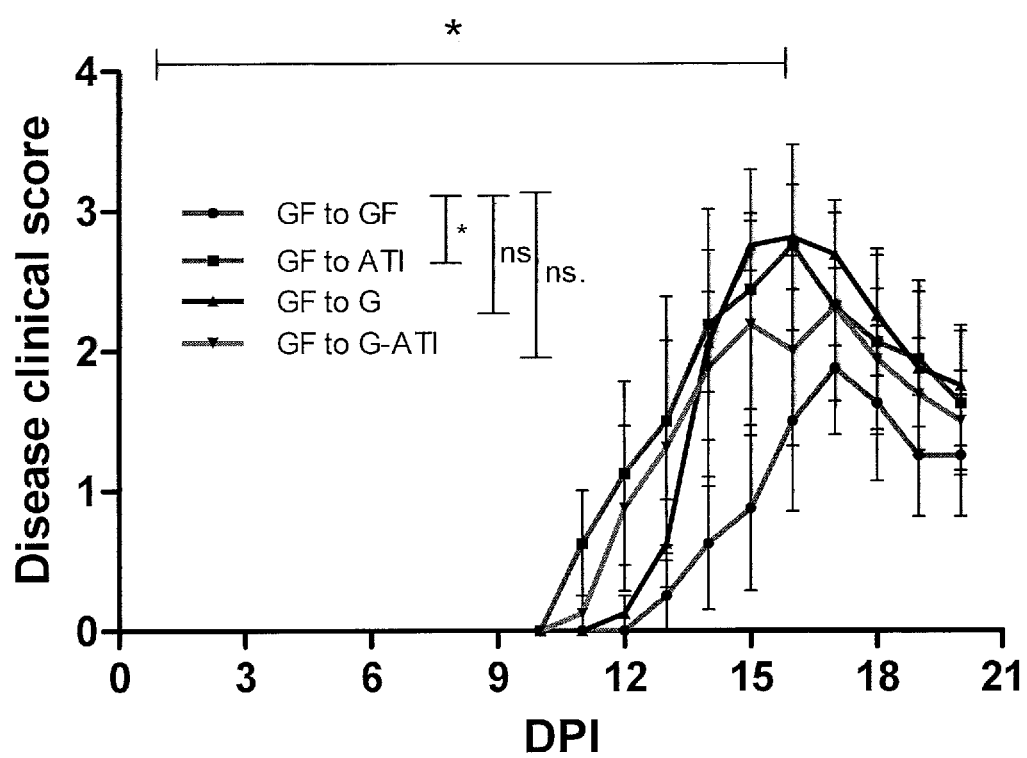
Figures 4A, 4B, 4C:
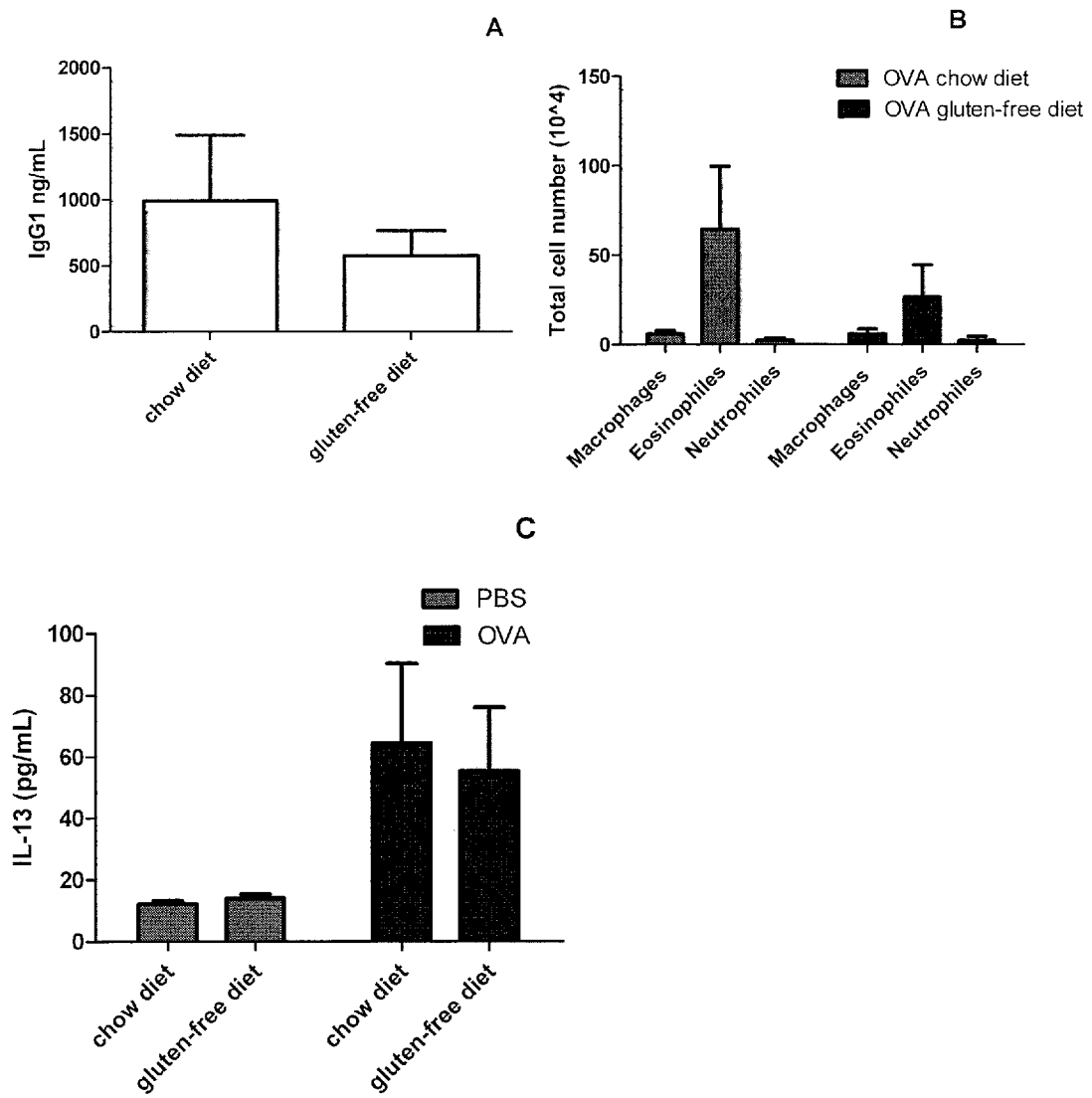
FIG. 4 shows that an ATI containing diet exacerbates allergic asthma. (A-F): Murine asthma model induced by ovalbumine (OVA) sensitisations and challenge in female C57BL/6 mice on a gluten-free diet (GFD, casein as protein source) or "normal" chow containing 25% of gluten (with about 15% w/w as ATIs)/75% casein as protein source). Serum IgG1 was analysed after the sensitisations (A). Animals were sacrificed after three challenges with PBS or OVA. Bronchoalveolar lavage fluid (BALF) was used to prepare cytospins and count cell populations (B). BALF was also used to measure IL-13 and IL-5 secretion (C and D). Histological lung sections were scored after H&E and PAS staining (E and F). (G-I): Murine asthma model induced by OVA sensitisations and challenge in female C57BL/6 mice on a gluten-free diet (GFD), as detailed in FIG. 4A. Animals were divided in 5 groups: group 1 continued with the GFD and was sensitised with PBS, group 2 continued with the GFD and was sensitised with OVA, group 3 changed to a diet containing 25% gluten (with about 15% w/w as ATIs)/75% casein as protein source), group 4 changed to a diet containing ATIs (casein-based protein source with 1% purified ATIs), and group 5 changed to a diet containing 25% gluten with low levels of ATIs (de-enriched of ATIs by about 70%). All groups were challenged with OVA and then sacrificed. Splenocytes were isolated from each group and stimulated with 3 µg/mL of OVA for proliferation assays (A). Supernatants were analysed for cytokines IL-13 and IL-5 (B and C). $p<0.01$, *$p<0.005$.
Figures 4D, 4E, 4F:
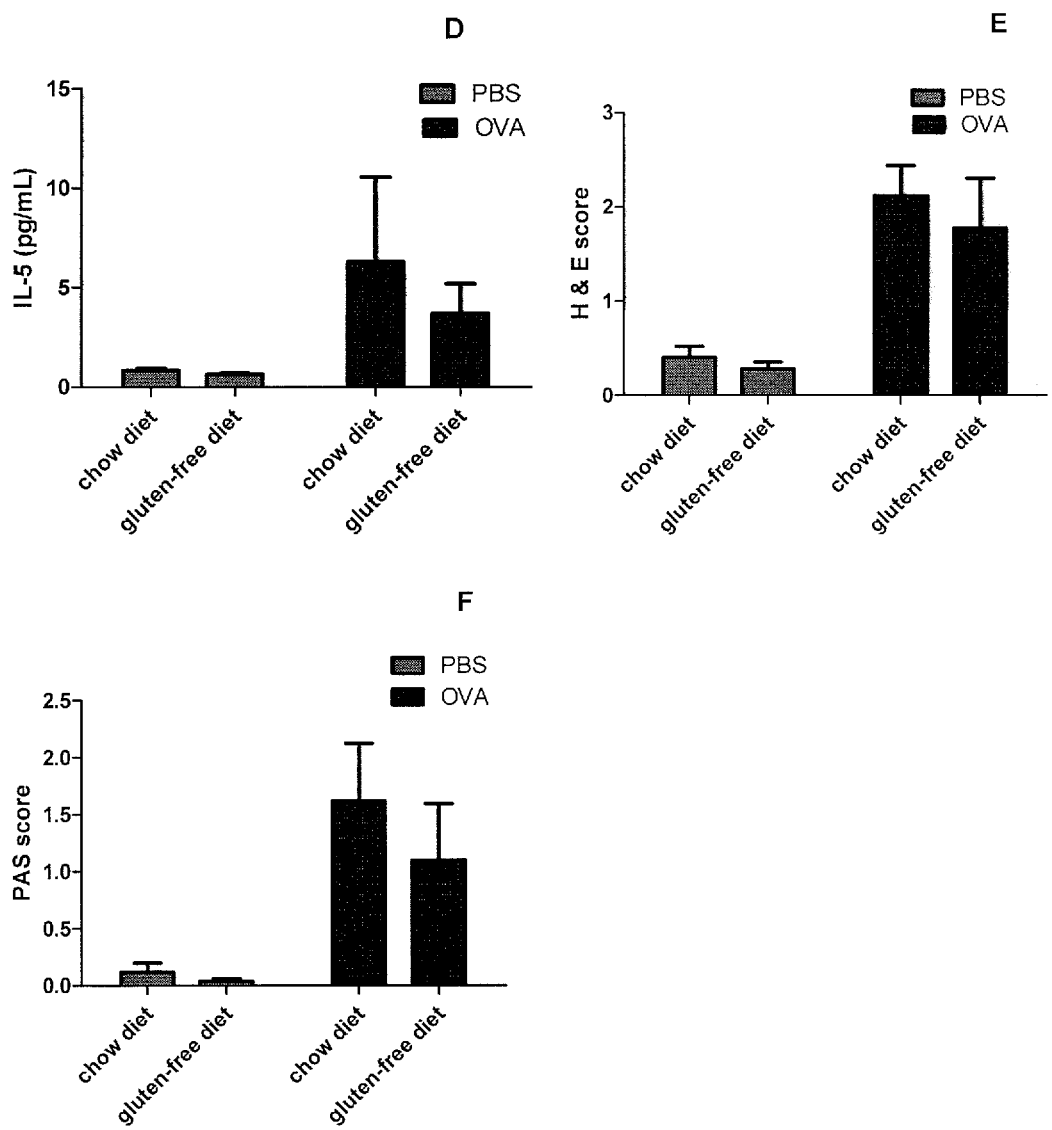
Figures 4G, 4H, 4I:
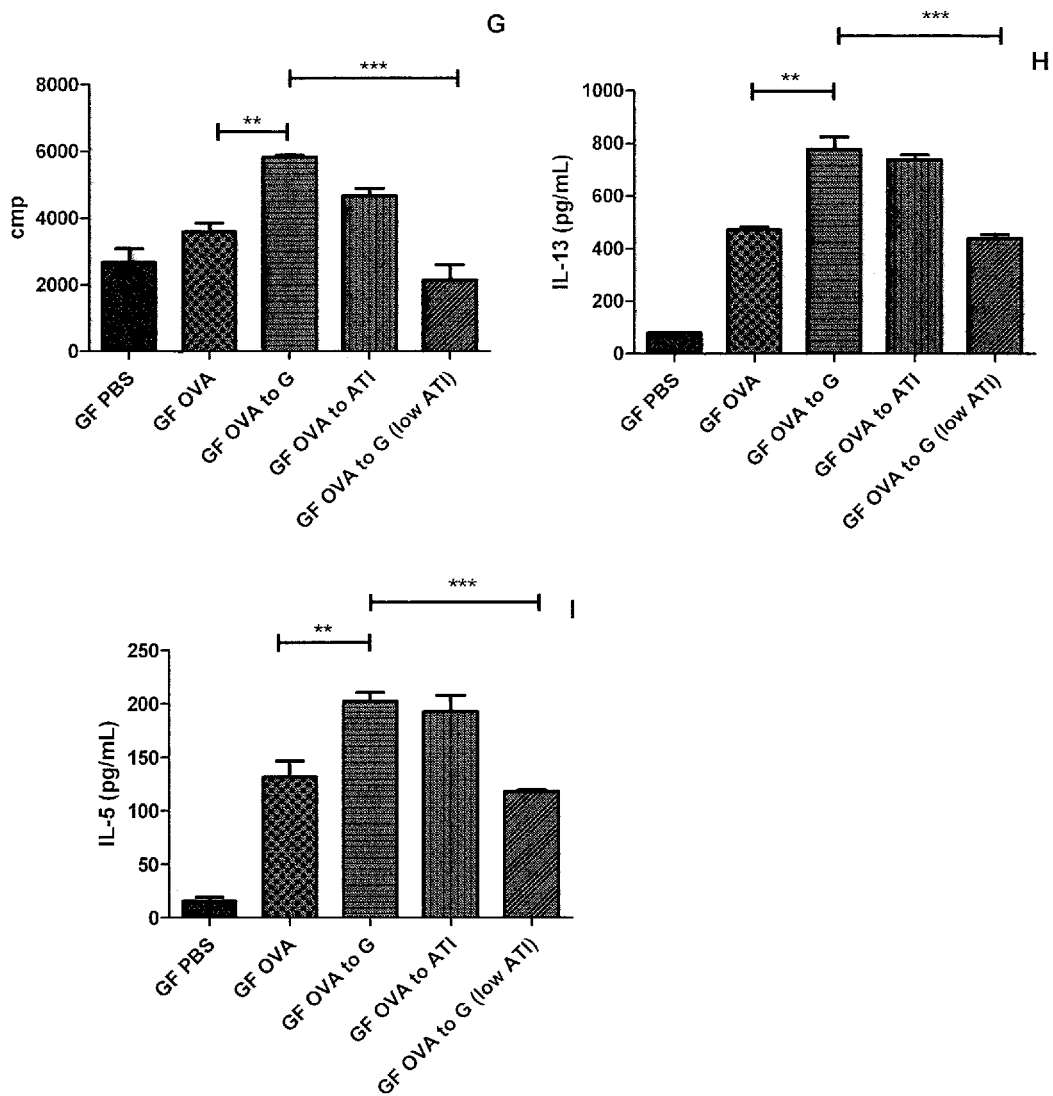

Amylase trypsin inhibitors (ATIs) (as a term for all structurally and especially functionally related molecules) are molecules present in plants that act as triggers of innate immune activation. ATIs affect not only celiac disease activity but other inflammatory conditions. As used herein, ATIs refer to molecules having TLR4-stimulating activities in foodstuffs. In some embodiments, ATIs stimulate responsive cells by mimicking the MD2 protein component of the tetrameric TLR4-signaling complex, which is composed of two molecules of TLR4 and two molecules of MD2.

The newly discovered activity of ATIs as nutritional activators of TLR4 is different from that of gluten in celiac disease and of wheat (rye, barley) proteins in allergy. ATIs can also act as inhalative allergens (Schuppan et al, *Gastroenterology* 2009; Batais et al, *Eur Ann Allergy Clinic* 2008; Catassi et al, *Nutrients* 2013; Uvackova et al, *J Proteome Res* 2013). Notably, the disease causing potency of ATIs ingested with wheat, barley, or rye (gluten-containing cereals), as well as with some non-gluten containing staples, is not limited to the gastrointestinal tract, but is also likely implicated to affect other extraintestinal diseases (Catassi et al., *Nutrients* 7:4966-4977, 2015; Fasano et al., *Gastroenterology* 148:1195-1204, 2015; Schuppan et al., *Best Practice & Research: Clinical Gastroenterology* 29:469-76, 2015). We have accumulated broad evidence that nutritional ATIs induce low grade but significant inflammation in the small intestine, colon, and. the surrounding mesenteric lymph nodes. Notably, nutritional ATIs exacerbate inflammatory diseases in general, as illustrated in mouse models of inflammatory bowel disease, of multiple sclerosis, of systemic lupus erythematosus, of non-alcoholic steatohepatitis, and of allergic asthma. FIGS. 1-4 demonstrate this "adjuvant effect" in the mentioned in vivo situations and diseases.

In addition to gluten-containing foodstuffs, such as wheat, barley, and rye, we also detected significant TLR4-stimulating activities caused by ATIs in some gluten-free foodstuffs, such as millet, soy, and quinoa. We also observed that foodstuffs cultivated at low altitude and/or with extensive fertilization tend to contain high levels of ATIs, while foodstuffs cultivated at high altitude and/or without fertilization often contain lower levels of ATIs or are even ATI-free. This can be explained by structural similarities of ATIs in wheat, rye, and barley (gluten-containing grains), e.g., the predominant CM3, CM2, 0.19, 0.28, and 0.53 variants in wheat and their homologues in barley and rye. Some of these ATIs are found in gluten-free staples. The methods of the invention can be performed in a variety of foodstuffs suspected of containing ATIs, including both gluten-containing foodstuffs and gluten-free foodstuffs, as well as foodstuffs that have been processed, e.g., by cooking or baking, which only slightly reduces ATI content and bioactivity. The methods of the invention allows the selection of wheat variants that express low levels of ATIs by measuring ATI content and/or bioactivity. Identification of wheat variants that express low levels of ATIs by measuring ATI content and/or bioactivity allows subsequent ATI de-enrichment of these wheat variants using the ATI-reducing/extracting methods described herein.

Some examples of foodstuffs that require ATI removal prior to consumption in order to produce less proinflammatory foodstuffs are shown in FIG. 10.

ATI Reducing Agents and Degrading Enzymes

ATIs are resistant to degradation by many known proteases, including digestive enzymes of the human gastrointestinal tract, such as pepsin, trypsin, and chymotrypsin. Much of this resistance is due to the presence of several (i.e., usually five) intramolecular disulfide bonds in ATIs that generate a compact secondary structure. Once the disulfide bonds in ATIs are reduced by reducing agents and ATIs are exposed to modestly elevated temperature, e.g., 60° C., depending on the buffer system, ATI activity is lost. However, ATIs can refold and regain bioactivity at lower temperatures. Therefore, one strategy to eliminate ATI bioactivity in foodstuffs is to further degrade ATIs using enzymes, thus preventing ATI refolding.

Reducing agents that can be used to reduce the disulfide bonds in ATIs include, but are not limited to, mercaptoethanol, dithioerythritol (DTT), cysteine, glutathione (GSH), oxidized glutathione (GSSG), protein bound glutathione (PSSG), sulfites, and thioredoxin. In some embodiments, an reducing agent may be balanced by, e.g., reduced glutathione (GSH). In some embodiments, bacteria with high disulfide reducing ability (e.g., *Lactobacillus* sanfranciscensis and *L. reuteri* LTH2584) may be used as a reducing agent. In some embodiments, a foodstuff may be cultivated and/or fermented with bacteria with high disulfide reducing ability (e.g., *Lactobacillus* sanfranciscensis and *L. reuteri* LTH2584). In some embodiments, one or more reducing agents may be added to the extraction buffer used to incubate the foodstuff. In some embodiments, one or more reducing agents may be used to reduce the disulfide bonds in ATIs prior to enzyme degradation. In some embodiments, one or more reducing agents may be used in combination (i.e., at the same time) with enzymes to reduce and degrade ATIs.

Enzymes, such as proteases, may be used to degrade ATIs. Proteases that may be used to degrade ATIs include, but are not limited to, pepsin, trypsin, chymotrypsin, elastase, thermolysin, bromelain, papain, subtilisin, an alkaline protease, a neutral protease, an acidic protease, a fungal protease, a yeast protease, and a bacterial protease. Alkaline, neutral, and acidic proteases are proteases that are the most active and work most optimally at basic (i.e., at a pH from about 8 to about 14), neutral (i.e., at a pH of about 7), and acidic pH (i.e., at a pH from about 1 to about 6) conditions, respectively. Examples of alkaline proteases that may be used to degrade ATIs include, but are not limited to, serine proteases, endopeptidases, Protease K, Alcalase® (Novozymes), Savinase® (Novozymes), Maxacal® (Genencor), Blap® (Henkel), KAP® (Kao Corporation), and other alkaline proteases known in the art, e.g., the alkaline proteases described in Anwar et al., *Biores. Tech.* 64:175-183, 1998, which is incorporated herein by reference in its entirety. In some embodiments, depending on the pH of the extraction buffer, one or more appropriate proteases (i.e., alkaline, neutral, and/or acidic proteases) may be selected to be added to the extraction buffer to degrade ATIs. For example, an alkaline protease (e.g., a serine protease) may be added to a basic extraction buffer.

In some embodiments, an enzyme may be specifically engineered or evolved to degrade ATIs (i.e., a synthethic enzyme). Techniques that may be used to engineer or evolve an enzyme to have novel capabilities are known in the art, i.e., random mutagenesis, protease library screens, mutant screens, gene recombination, gene site saturation mutagenesis (GSSM) as described in U.S. Pat. Nos. 6,171,820 and 6,579,258, and tunable gene assembly (TGR) as described in U.S. Pat. No. 6,537,776, each of which is incorporated herein by reference in its entirety. In some embodiments, an enzyme used to degrade ATIs may be engineered to have both functions of a disulfide bond reducing agent and a protease. In some embodiments, the enzyme specifically engineered or evolved to degrade ATIs may be used in combination with one or more proteases, such as pepsin, trypsin, chymotrypsin, elastase, thermolysin, bromelain, papain, subtilisin, an alkaline protease, a neutral protease, an acidic protease, a fungal protease, a yeast protease, and a bacterial protease.

EXAMPLES

Example 1—Methods to Determine the (Proinflammatory) Bioactivity Due to ATIs in Unprocessed and Processed Foods 1.1. Quantitative Extraction of ATIs and Proteolytic Digestion of ATIs Quantitative ATI Extraction from Different Cereals, Grains, and Foods for Determination of Bioactivity Buffer/solvent extractive method (applicable to most unprocessed foods, see sketch in FIG. 5):

1. Dried material is ground and sieved
2. 20 g are defatted with 200 ml methanol/diethylether 1:1 for 2 h at 4-8° C. (stirring)
3. Centrifugation at 5.000-10.000 rpm for 10-30 min Steps 2.-3 can also be omitted, without significant loss of bioactivity 4. Pellet is extracted with 200 ml of 50 mM ammonium bicarbonate (Abic) overnight at 4° C. (stirring)
5. Centrifugation at 5.000-10.000 rpm for 10-30 min
6. Supernatant is freeze dried
7. Second (third) extraction as above
8. Combined supernatant is freeze-dried
9. Freeze dried material is reconstituted in e.g. 2 ml of PBS or cell culture compatible buffer or media Other solvents such as chloroform/methanol (CM) can also be used, but they predominantly extract the more hydrophobic CM-class of ATIs, leaving other ATI species largely not extracted. Sequential extraction using CM and the above solvents/buffers or vice versa is possible.

Buffers may vary in composition. Thus ammonium bicarbonate can also may be used in lower (e.g., 5 mM) or higher (e.g., 100 mM) concentrations, other neutral or slightly alkaline buffers can be used. Even acidic extraction is possible, e.g., by using 50 mM acetic acid. However acidic buffers co-extract significant amounts of other proteins such as gluten (further described in detail below).

Figure 6A:
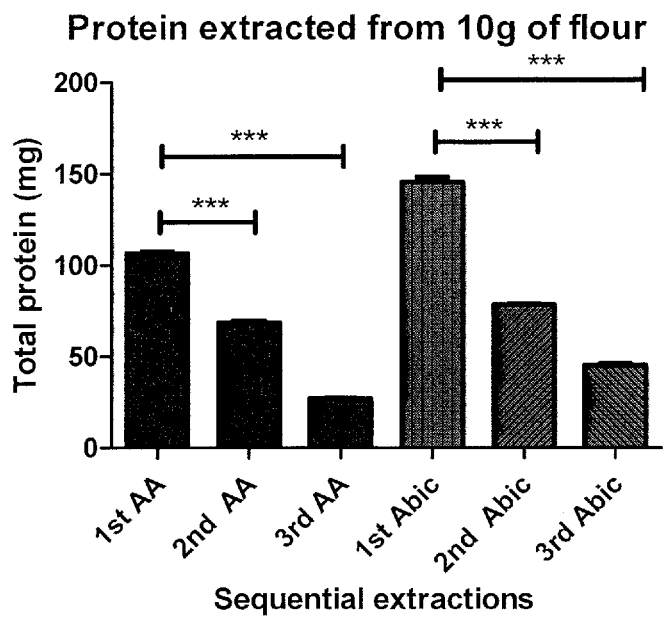
FIG. 6 shows extraction and bioactivity determination of ATIs from wheat flours. (A and B): Total protein extracted sequentially from 10 g of flour from modern wheat and from more ancient wheat variants (Iran, Kamut) AA: 0.05% acetic acid; Abic, 50 mM ammonium bicarbonate buffer. Bioactivity assay using the human monocyte-macrophage cell line THP-1 and standardized lyophoilized extracts (combined $1^{st}$ and $2^{nd}$ extract representing >90% of total ATIs). (C, D, and E): Sequential extraction (3 extractions) with ammonium bicarbonate ($AB_{ic}$) of commercial wheat flour and two more ancient hexaploid wheat variants (Iran and Kamut). Sequential extractions using different time points (from 0.5 to 24 h), different concentrations of Abic, and determination of the ATI bioactivity of each extract.
Figure 6B:
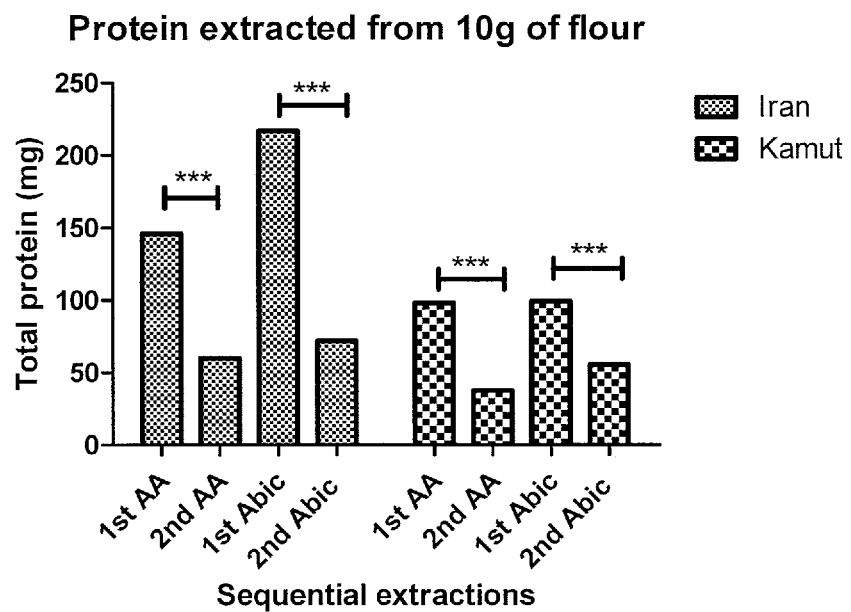
Figure 6C:
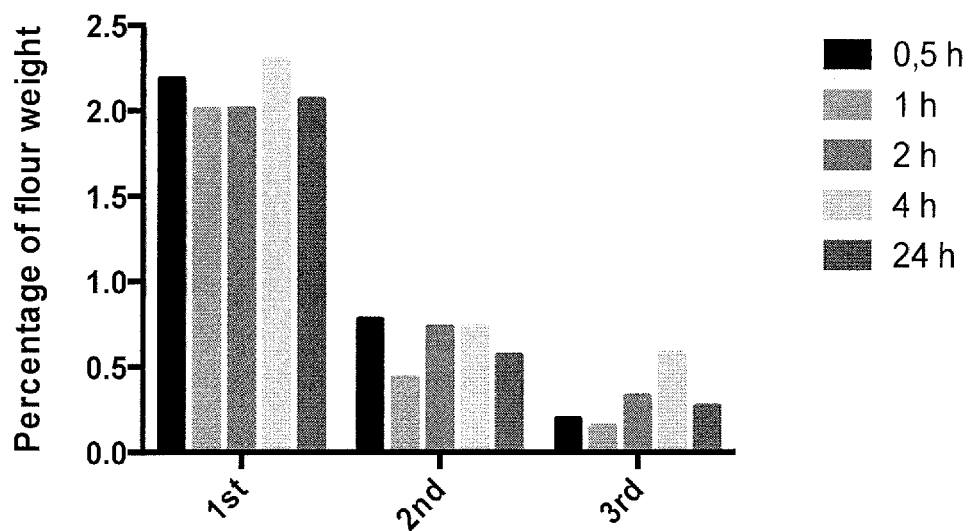
Figure 6D:
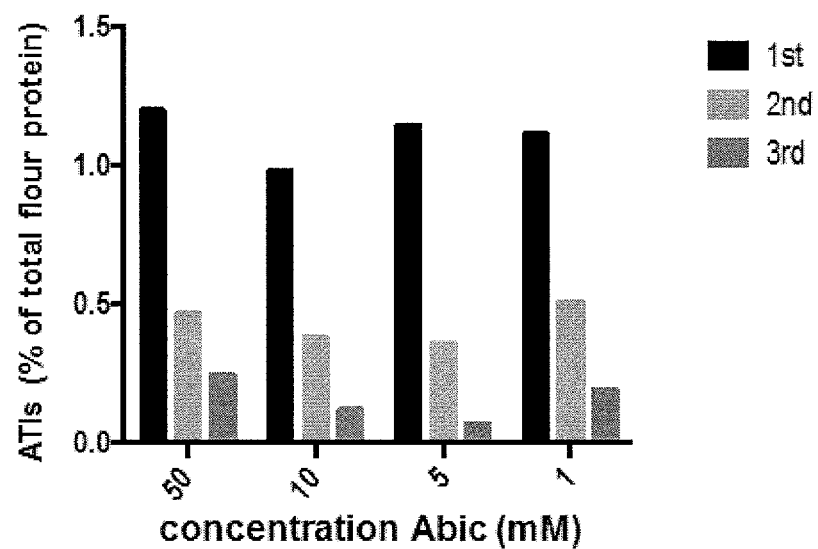
Figure 6E:
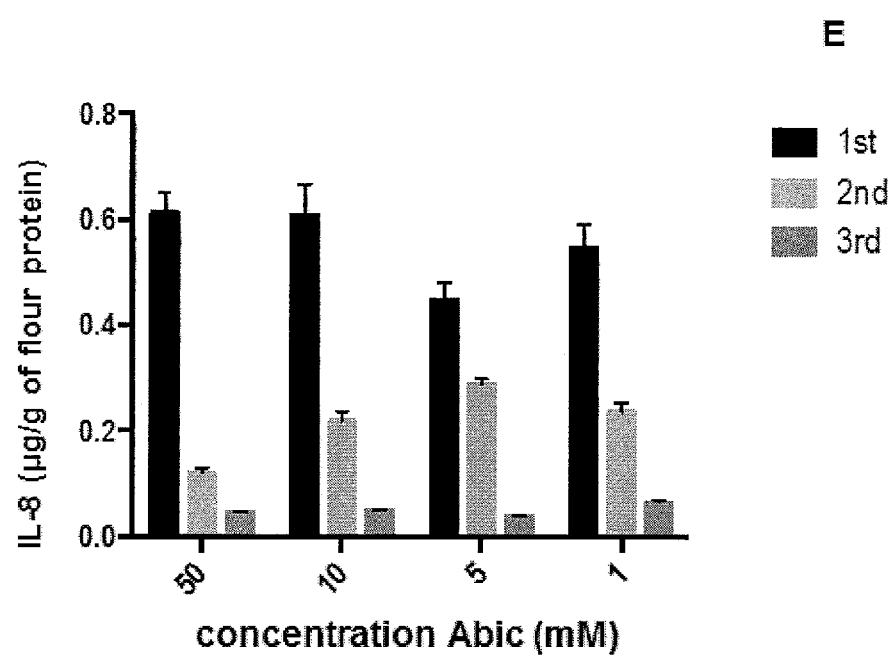

Notably, ATI bioactivity and ATI quantity can be determined from two exhaustive extracts with the above buffers, e.g., alkaline buffers containing salt (e.g., NaCl up to 1.0 M) usually extract 80-90% of total ATIs (FIG. 6C-6E). Here, both extracts can be combined to be used directly or in a dilution for bioassay or ELISA.

Figures 7A, 7B:
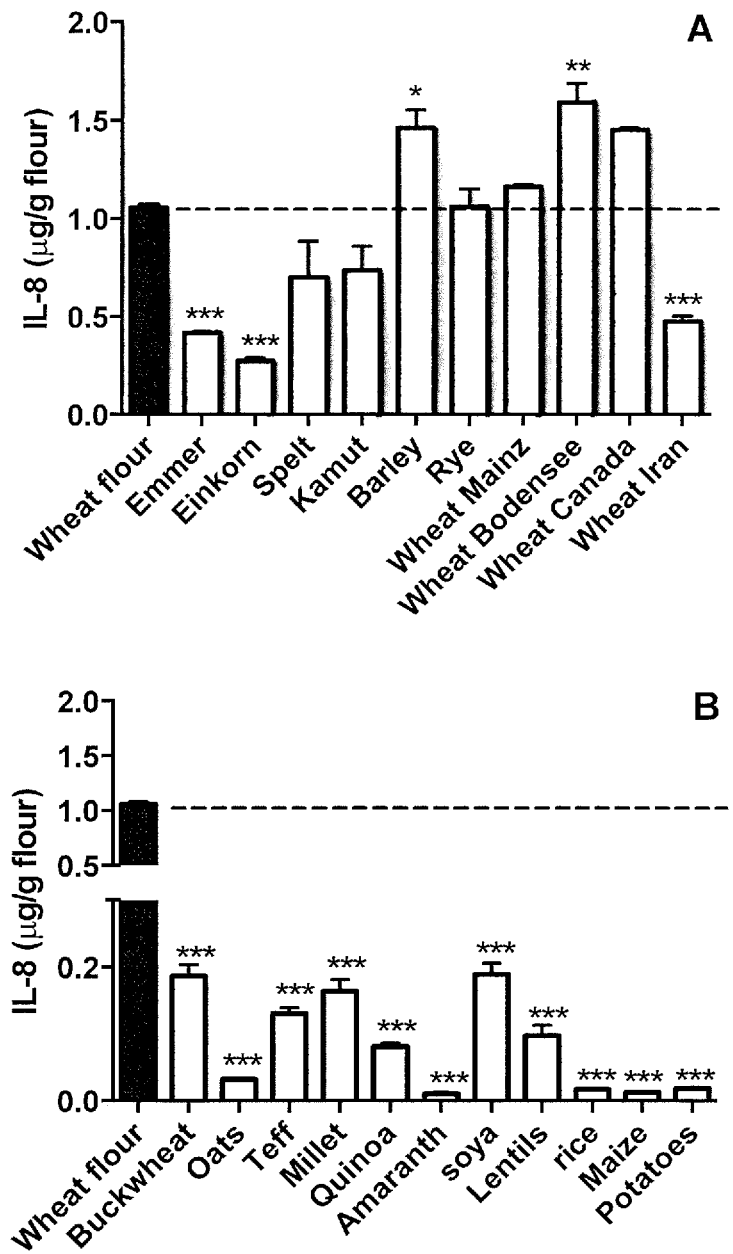
FIG. 7 shows extraction and bioactivity determination of ATIs from flours and foods. (A, B, C, D, and E): Bioactivity of gluten containing cereals, gluten-free staples/plants, products manufactured with wheat, different wheat cultivars (all modern hexaploid (kind gift of Dr. F. Longin, Univ. of Hohenheim, Germany)), and commercial beers. In these bioassays, 1 µg of IL-8 release equates to ~2 mg of ATIs.
Figure 7C:
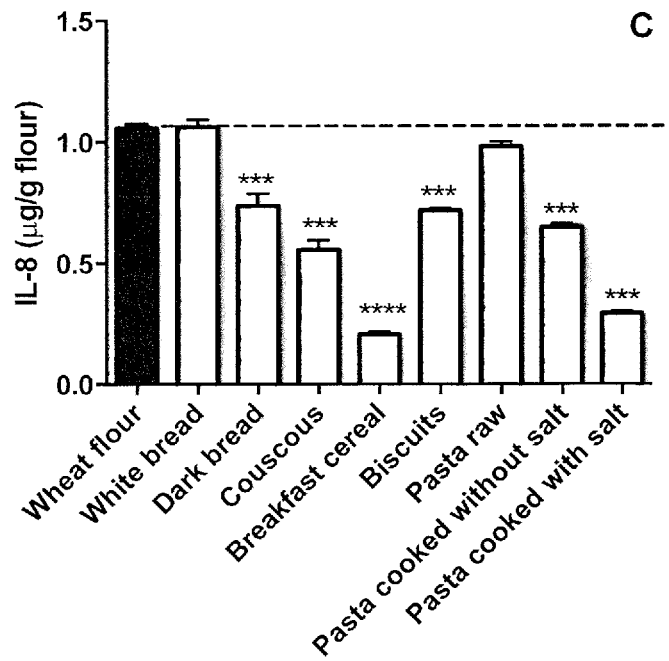
Figure 7D:
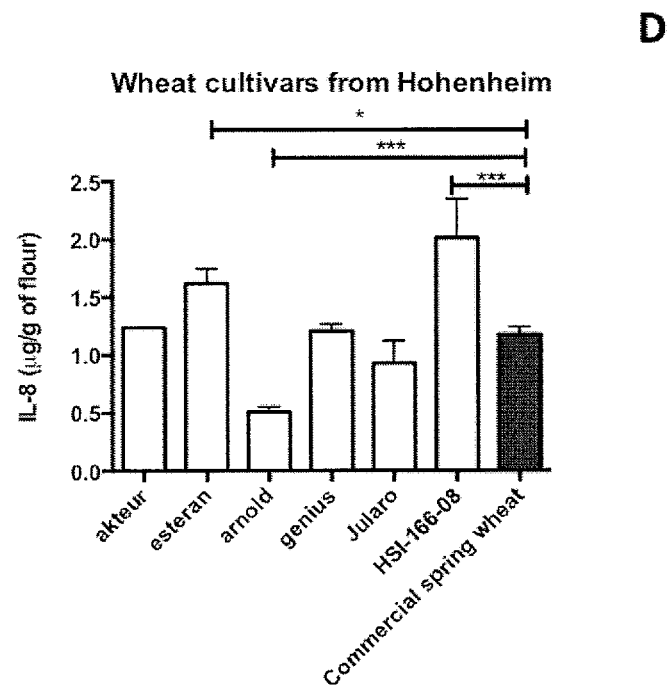
Figure 7E:
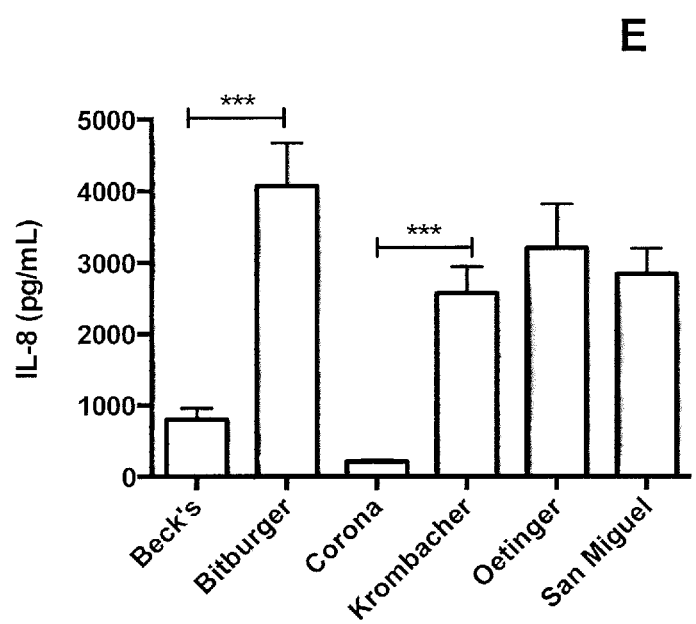

In other cases, e.g., in liquid foods, such as beer, ATI bioactivity and ATI quantity can be directly determined from these liquids, without extraction (see FIG. 7E for beers).

Quantitative ATI Extraction from Further Processed, e.g. Cooked or Baked Foods Such as Bread, Cookies, Pasta or Pizza 1. Dried material is ground and sieved
2. 20 g are defatted with 200 ml methanol/diethylether 1:1 for 2 h at 4-8° C. (stirring)
3. Centrifugation at 5.000-10.000 rpm for 10-30 min Steps 2.-3 can also be omitted, without significant loss of bioactivity 4. Pellet is digested with (gastrointestinal) proteases that do not significantly degrade the highly disulfide linked ATIs, such as pepsin followed by trypsin to better extract ATIs from the food matrix.

Proteolytic Digestion of ATIs

Example of proteolytic digestion (pepsin-trypsin digestion protocol) can be found in Frazer et al, Lancet 1959. A brief example is described below.

1. 1 g of suspended sample is digested with pepsin (10 mg in 0.5 mL of 0.1 M HCL, pH 1.8) at 37° C. for 4 h.
2. Sample is centrifuged at 4,500 rpm for 10 min and the pellet is discarded.
3. Supernatant's pH is adjusted from 1.8 to 7.8 with NaOH and then trypsin (Sigma T9201, 10 mg in 0.5 mL neutral buffer, such as PBS) is added and incubated at 37° C. for 4 h.
4. pH is adjusted to 4.5 with HCl and N-tosyl-chloromethyl-ketone (TLCK, 10 mg in 0.5 mL DMSO) is added to block the trypsin.
5. Precipitate is removed by centrifugation at 4,500 rpm for 10 min.
6. Pellet is discarded and supernatant is dialysed (molecular weight exclusion e.g. 1000 D) in 10 mM ammonium bicarbonate, Ph 7.8 (4 L, 2 changes) at 4° C.
7. Samples are sterile filtrated and freeze-dried.
8. Protein concentration may be determined by using a bicinchoninic acid protein assay (Pierce).
9. Freeze dried material is reconstituted in e.g. 2 ml of PBS or cell culture compatible buffer or media.

Other buffers and buffer and enzyme concentrations can be used, as long as enzyme activity is maintained. In some, e.g., hardly baked, foods, more harsh conditions may be applicable. Also other enzymes such as chymotrypsin or thermolysin can be used exclusively (as neutral protease) or in combination with trypsin, since these can leave ATIs largely intact, while degrading other, major (cereal) proteins such as gluten (Camus and Laporte, Reprod Nutr Dev 1980; Gessendorfer et al, Anal Bioanal Chem 2009; Jos et al, Scand J Gastroenterol 1975; Rombouts et al, Sci Rep 2013).

Figure 8A:
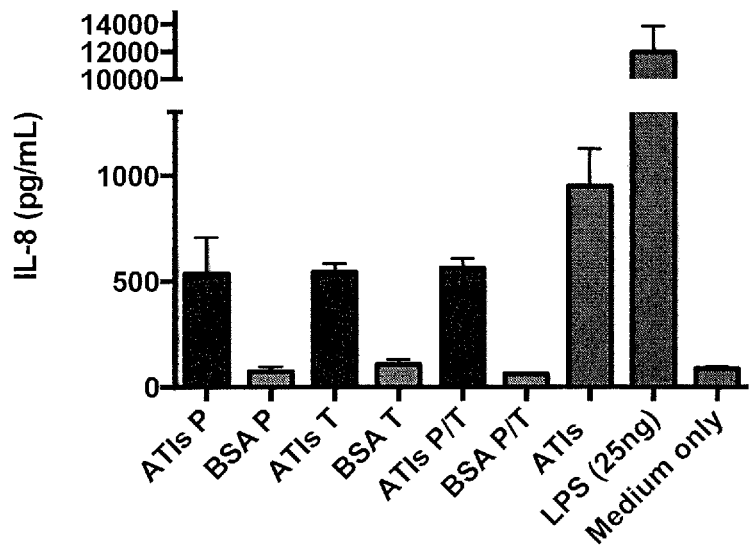
FIG. 8 shows (A) resistance of purified ATIs from wheat to a 2 h digestion with pepsin, typsin or the sequence of pepsin and trypsin (enzyme:substrate ration 1:100 at 37° C.; bioactivity is reduced by only ~30% after these digestions; BSA served as negative control. (B and C) extraction and bioactivity determination of ATIs from different commercial glutens, and from gluten containing bread vs flour compared to gluten free bread and cooked pasta (all after pepsin.trypsin digestion followed by two sequential combined ammonium bicarbonate extractions). (D): complete ATI inactivation by reduction and alkylation at elevated temperature; LPS served as positive control in the used THP1 cell bioassays.
Figure 8B:
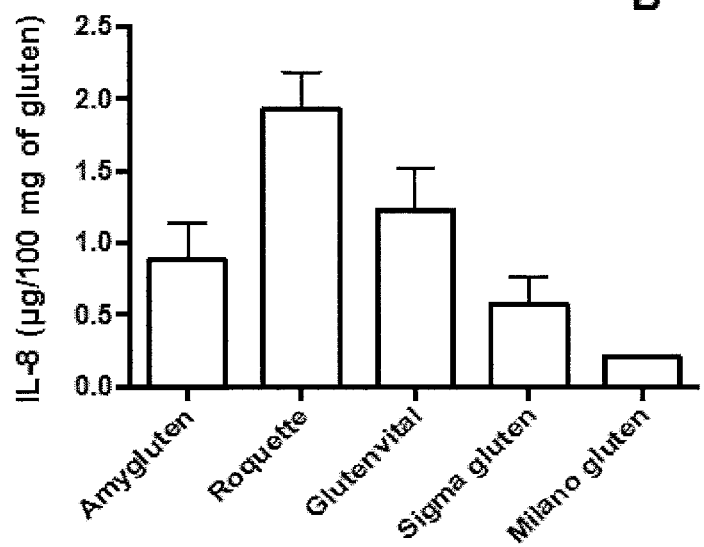
Figure 8C:
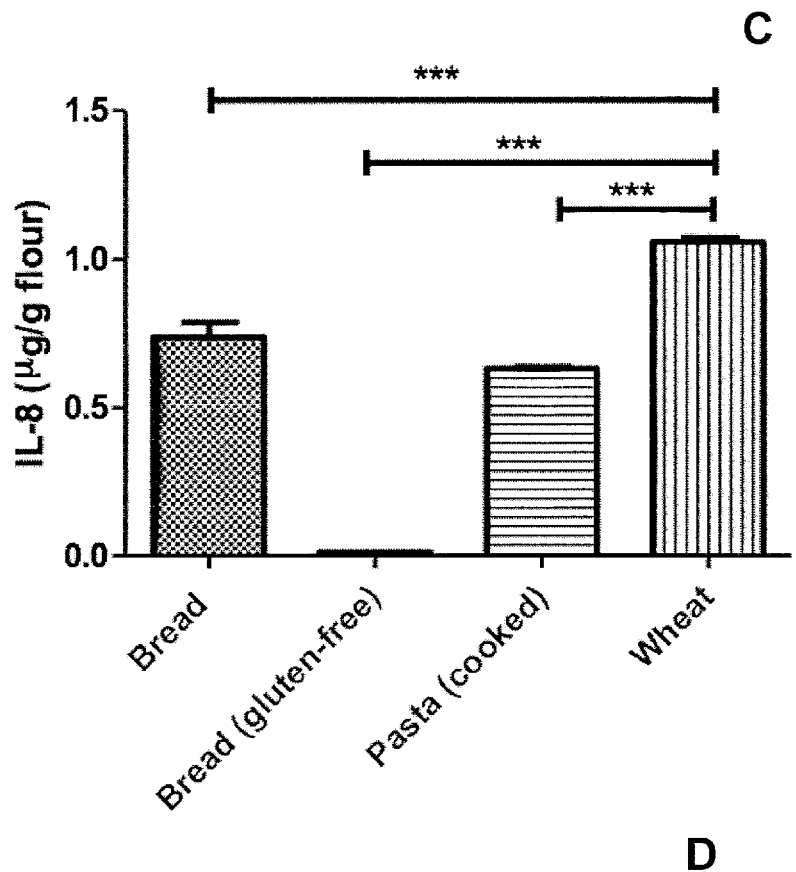
Figure 8D:
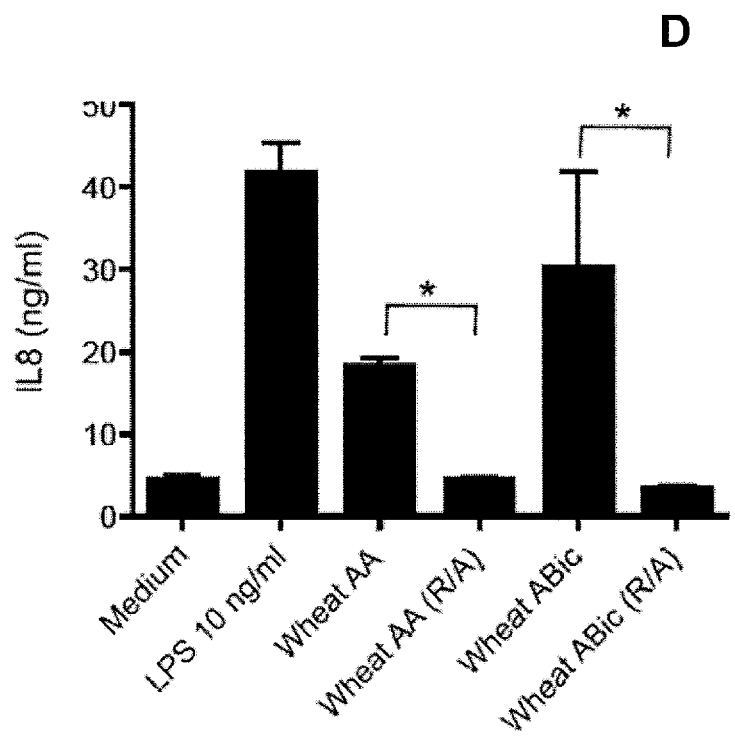

Due to their resistance to gastrointestinal proteases, ATIs remain largely intact after these proteolytic extraction procedures and maintain bioactivity. Our in vitro studies show that even with purified ATIs, the above-described digestion procedure reduces bioactivity by maximally 40%. Moreover, extracted bioactivity of 1 g of wheat flour before baking (10-20 min at 150-180° C.) is reduced by maximally 50% post baking (see examples in FIGS. 7C, 8A, and 8D).

1.2 Bioactivity Assays

Examples of bioactivity determinations are shown in FIGS. 6-10.

Cell Culture

ATI extracts (freeze dried or centrifuged/concentrated) as described in Example 1 and reconstituted in cell-culture compatible buffers, are added to cultures of ATI-reactive (TLR4-bearing) cells, preferably monocytes/macrophages, dendritic cells, or cells transfected with the TLR4-MD2-CD14 oligomeric signaling complex. It is also preferable to use stable cell lines such as human THP-1, U937, or TLR4-MD2-CD14 transfected HEK-293 cells (obtainable e.g. from American Type Culture Collection). Apart from human cells, cells of other species such as mouse or rat can be used. Culture is preferably in complete RPMI or DMEM supplemented with 100 IU/ml penicillin/100 µg/ml streptomycin and 10% fetal calf serum at 37° C. in a 5% CO2 atmosphere. Cells should be *mycoplasma*-free for reproducible results. Usually 1-1004 of the reconstituted extracts described in Example 1 are added to the cultures of the indicator cells (preferably seeded at densities of 25,000-200,000 cells in 0.2-1 mL medium in 24 well culture plates). Culture supernatants and/or cells are preferably harvested at 12-24 h post addition of the extracts to be tested.

Cytokine/Chemokine Assays.

The release of several chemokines and/or cytokines into the cell culture media due to addition of ATIs/ATI extracts to the above cells can be quantified to serve as a quantitative measure of stimulatory ATI activity. Examples are IL-8, IL-15, TNFa, CCL2 (MCP-1), CCL5 (RANTES). This can be done using commercial validated ELISAs (e.g. IL-8 and TNFa [BD]; MCP-1, IL-15, RANTES [R&D Systems]) according to the manufacturers' protocols. Apart from TLR4-dependent cytokines and chemokines, other secreted or cell extractable proteins/peptides downstream of TLR4 activation can be measured, including heat shock proteins (such as Hsp27, Hsp70, Hsp90) activation or known from the literature.

Use of Cells Transfected with TLR4-MD2-CD14 and an Indicator Gene

Figure 9A:
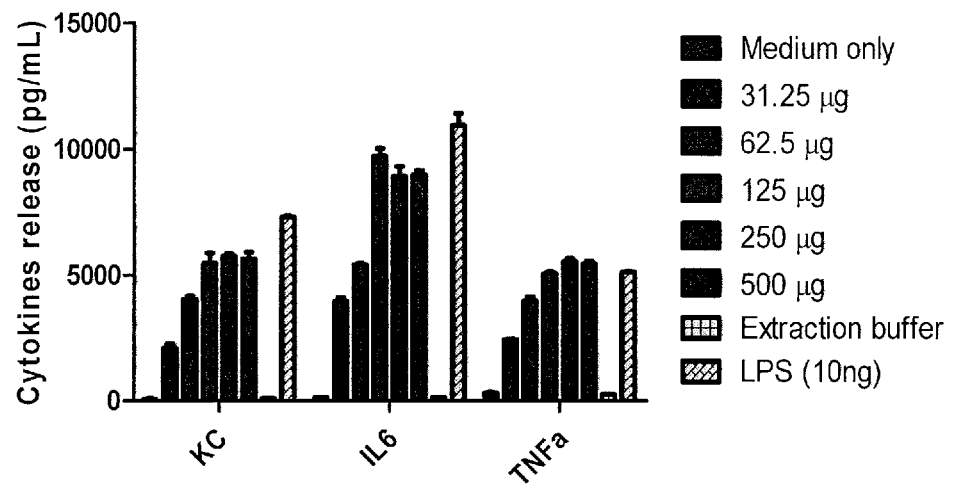
FIG. 9 shows other high sensitivity bioassays for bioactivity quantification of extracted ATIs. ATI extracts with Abic were lyophilized and standardized as to protein content. Dose dependent stimulatory response in (A) murine bone marrow-derived dendritic cells (BM DCs) and (B) a TLR4/MD-2/CD14/IL-8 Prom/LUCPoter™ HeLa cell line. Compared with the THP-1 cells used in FIG. 6, these readout cells showed higher sensitivity for ATI-bioactivity (ceiling effect at concentrations above ~50 and ~100 μg of ATI per ml).
Figure 9B:
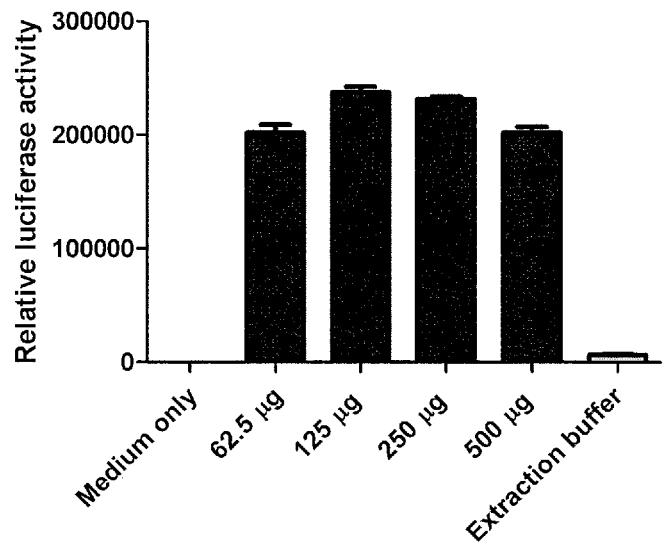

The lipopolysaccharide (LPS) receptor complex of TLR4, MD-2 and CD14 has been identified ATI-sensing receptor complex (Junker et al, J Exp Med 2012). Since IL-8 is a major cytokine induced by TLR4, a reporter cell line which stably expresses TLR4, MD-2 and CD14 proteins and the *Renilla* luciferase reporter gene under the transcriptional control of the IL-8 promoter was developed and is commercially available (R&D Systems, San Diego, Calif.; Lee et al 2013). We used this cell line to test ATI activity and compared values to those obtained with IL-8, MCP-1 and TNF-α release from ATI-stimulated THP-1 cells (FIG. 9). Other indicator systems that, e.g., generate fluorescent products or release soluble products that can be quantified in the cellular supernatant as described in Example 1, or harbor other promoters that are driven by the activation of the TLR4-MD2-CD14 can also be used. These systems are particularly well suited for high throughput or high quantitative measurements of TLR4-complex stimulating ATI-activity.

Other Assays for Determination of ATI Bioactivity

RNA Isolation and Quantitative RT-PCR

Total RNA is isolated from cells using e.g. TRIzol (Invitrogen). Quantitative RT-PCR is preferably performed using exon-exon boundary-spanning primer sequences and e.g., the SYBR green or Taqman methodology as described for a set of cytokines by Junker et al (2012). Apart from TLR4-dependent cytokines and chemokines, other transcripts downstream of TLR4 activation can be measured, including heat shock proteins (such as Hsp27, Hsp70, Hsp90) but also other transcriptionally activated genes known from the literature.

Flow Cytometry

After stimulation with extracted ATIs the above cells can also analyzed using flow cytometry that quantifies activation markers. Activation markers are e.g. CD80, CD86, MHC class II, IL-12, IL-23, interferon gamma (intracellular stain) and many others known from the common literature. Cells are preincubated with FcR blocking reagent (Miltenyi Biotec) for 15 min at 4° C. before staining preferably with fluorescent-labeled monoclonal antibodies to these activation markers at predetermined concentrations for e.g. 30 min at 4° C. Cells are then washed with staining buffer (e.g. PBS and 1% BSA), cell viability is assessed by DAPI exclusion (0.1 µg/ml; Roche), and only viable cells are analyzed by flow cytometry using e.g. a four-laser LSRII and FlowJo software (Tree Star) as described (Junker et al, J Exp Med 2012).

Altered Signal Transduction

Other quantitative readouts that can be used to measure ATI activity in samples are based on activation (or inhibition) of signaling pathways in the responsive cells. Examples are the phosphorylation of certain kinase substrates, such as IRF-3 or NFkB (p65), or NFkB nuclear translocation.

Lymphocyte Proliferation Assay

This method exploits the ability of TLR4-complex stimulated antigen presenting cells (such as monocytes, macrophages, dendritic or B cells) to permit proliferation or activation of antigen specific T cells in the presence of antigen. An example is the incubation of ovalbumin or gluten specific T cell lines or T cell clones, and HLA-compatible antigen presenting cells or cell lines loaded with ovalbumin (ova peptide) or gluten (gluten peptide), respectively. An (unknown amount of) ATI added to these cultures will dose-dependently stimulate T cell proliferation which can be measured in standard T cell proliferation assays, using e.g. 3H-thymidine or BrdU incorporation. A simplified version of such assay is the addition of ATI-containing solutions to a classical mixed lymphocyter reaction with white blood cells of peripheral human or non-human, e.g. rodent, blood, or e.g., rodent splenocytes.

Example 2—Methods to Determine the Chemical Quantity of ATIs in Unprocessed and Processed Foods 2.2 Quantitative Extraction of ATIs from Food These methods permit another, even more thorough extraction of the highly proteolytically resistant ATIs (this resistance is mainly due to the presence of usually 5 intra-molecular disulfide bridges), especially from processed, e.g., baked foods. Chemical quantification after reductive extraction is quantitative, but leads to loss of bioactivity due to unfolding of the proteins. However, this does not affect protein quantification. Extraction preferably uses reductive methods with or without detergents, and with or without additional proteolytic digestion.

These methods permit quantification of all ATI-species in a given cereal or staple variant. Thus whole wheat genome sequencing revealed that modern hexaploid wheat contains up to 16 different ATI-species, and about half of these have been characterized as proteins. Moreover, ATIs represent between 2% and 4% of total wheat protein (with 80%-90% being gluten proteins). Importantly, ancient and older (diploid, tetraploid and early hexaploid) wheats often contain fewer ATI genes and proteins (Altenbach et al, BMC Res Notes 2011; Dupont et al, Proteome Sci 2011) (FIGS. 7A-7D and 10). Finally, a second fertilization cycle (post anthesis fertilization) increases total protein content (mainly gluten), but decreases ATI content (Altenbach et al., Proteome Sci 2011). This is reflected by our bioactivity determinations shown in FIG. 7D, which demonstrates dependence of ATI content (bioactivity) per gram of flour on the genetic background of the cereal, on the growing location, and on the extent of fertilization. We also show that the various ATI-variants, such as the predominant CM3 and 0.19 species in wheat, display similar TLR4-stimulating bioactivity on a molar basis (see below).

Importantly, the other major gluten containing cereals (barley and rye) express various amylase/trypsin/chymotrypsin/subtilisin inhibitors with high sequence homology to the wheat ATIs (Pekkarinen et al, J Agricult Food Chem 2003; Junker et al, J Exp Med 2012) and with similar overall TLR4-stimulating bioactivity (FIGS. 7A and 10).

Importantly, some gluten-free grains and staples contain relevant ATI bioactivity, which can be explained by ATI-species with structures resembling the wheat ATIs. In some embodiments, the ATI bioactivity in some gluten-free grains reaches up to about 20% the bioactivity in modern hexaploid wheat (FIG. 7B), Example: Reductive Extraction of ATIs.

One gram of the (dried) food to be analyzed is extracted in neutral, near neutral or alkaline solvents/buffers, such as PBS, Tris-buffer, ammonium bicarbonate, preferably containing a detergent or detergent mixture (e.g., sodiumdodecyl sulfate, Triton X-100, Tween-20, sodium deoxycholate), and a reducing agent, such as 2-mercapto-ethanol, dithioerythritol (DTT), e.g. at 5-200 mM and at 37° C. for 30 min to 4 hrs. For stabilization of free thiol groups, samples should be alkylated, e.g., with iodoacetamide at a final concentration of 20-500 mM for 10-60 min in the dark. Iodoacetamide will be quenched by excess reducing agents, e.g., 200 mM DTT. The cleared supernatant can be separated from small molecular weight contaminants e.g. by dialysis or ultrafiltration. For mass spectrometry the suspension (cleared supernatant) can be further digested, e.g., with trypsin.

For further analysis samples can be freeze-dried, concentrated in solution, e.g., by ultracentrifugation, or protein can be adsorbed to a solid support. For mass spectrometry, peptides are preferably adsorbed to a solid support.

2.2 Quantification of Extracted ATIs

Examples of chemical quantification of ATIs in flours are shown in FIGS. 11-14.

Mass Spectrometry

Figure 12A:
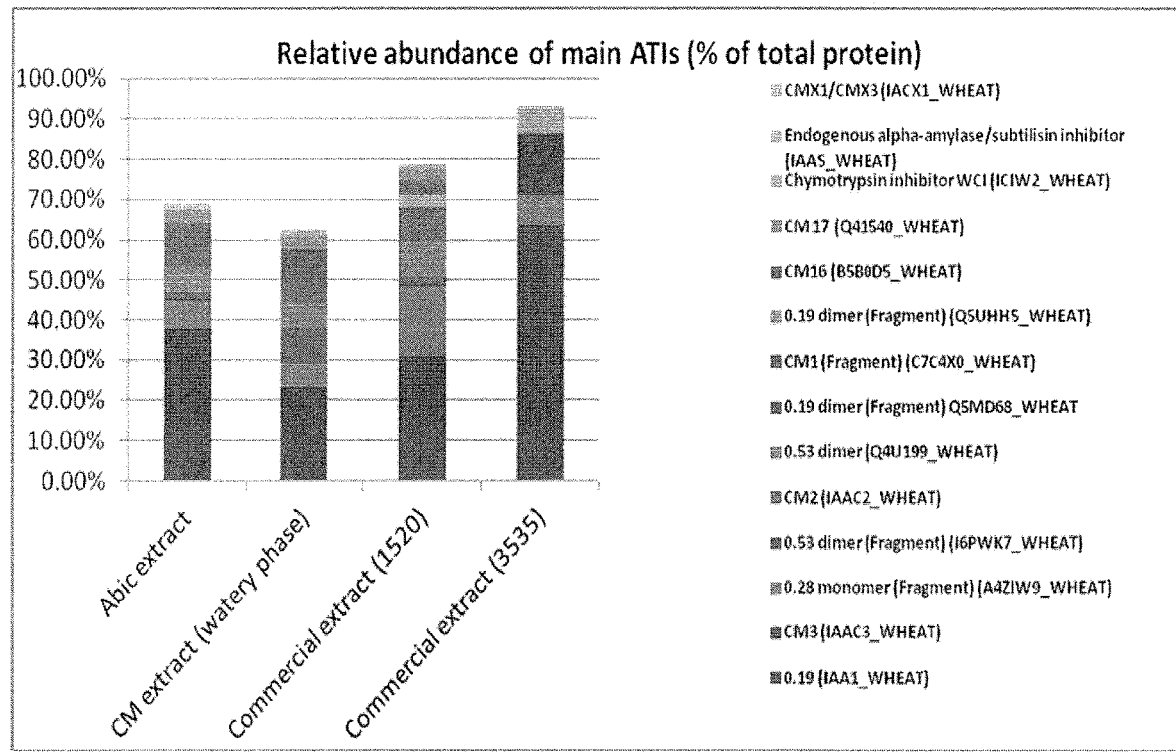
FIG. 12 shows (A): determination of total ATI-quantity and ATI-species in different wheat extracts using mass spectrometry and (B): relative amount of main ATIs in different extracts as well as other ATIs that include chymotrypsin inhibitor WCI, endogenous alpha-amylase/subtilisin inhibitor and CMX1/CMX3.
Figure 12B:
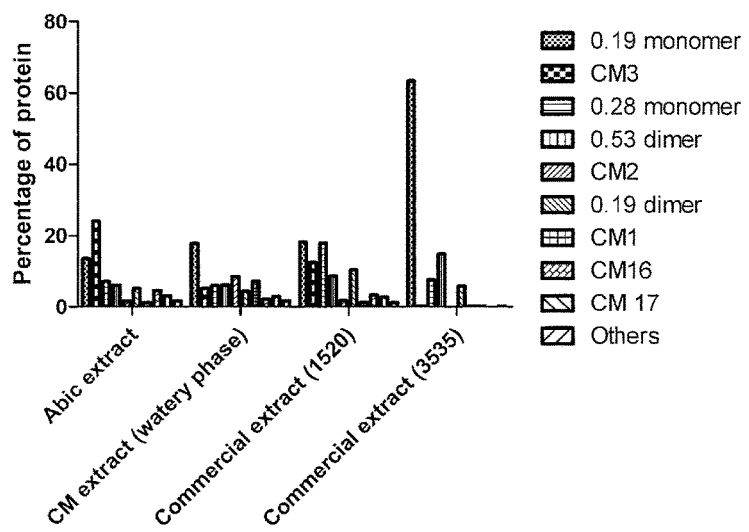
Figures 13A, 13B:
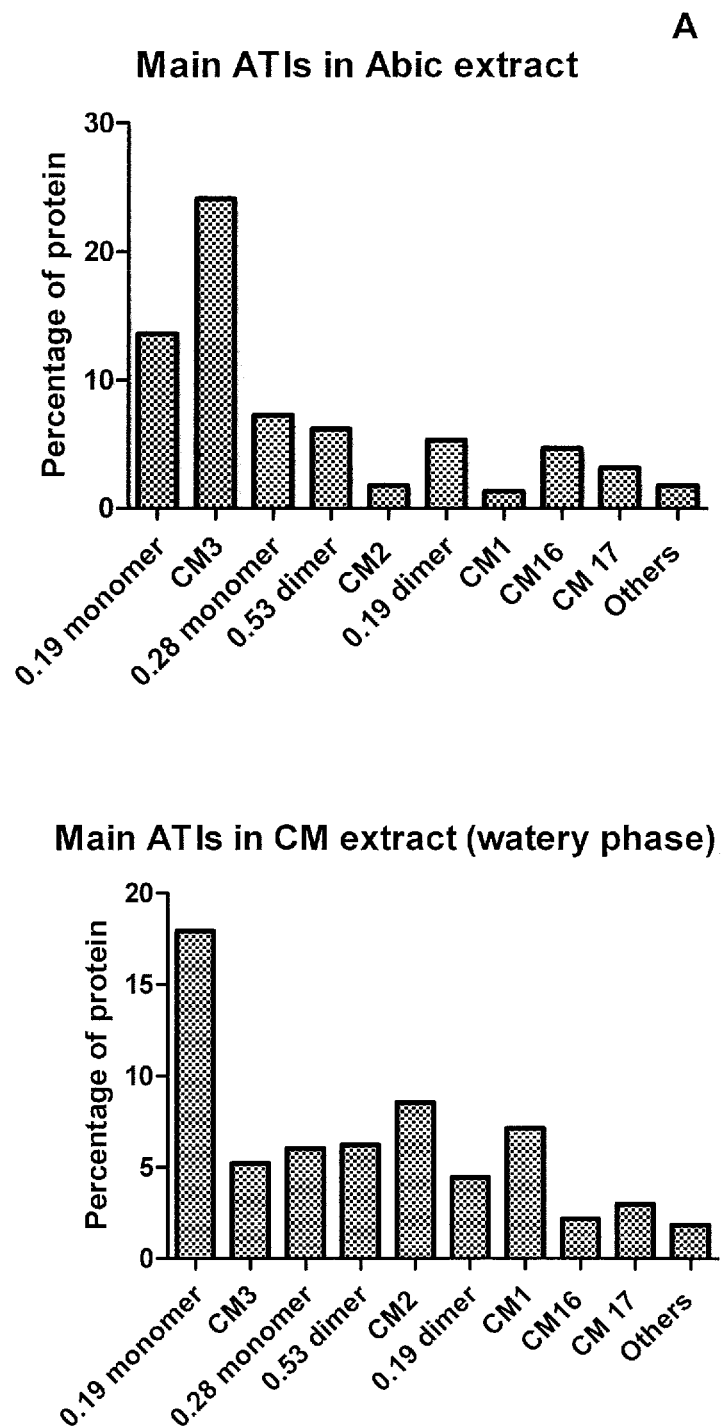
FIG. 13 shows relative quantity of ATI-species in different wheat extracts using mass spectrometry. (A): Abic extract, (B): chloroform/methanol (CM) extract, (C): commercial extract (1520), and (D):
commercial extract (3535). Lyophilized ATI-extracts (Abic and chloroform-methanol) were reduced/alkylated, digested with trypsin, and subjected to mass spectrometry. "Others" include chymotrypsin inhibitor WCI, endogenous alpha-amylase/subtilisin inhibitor, and the rare ATIs CMX1/CMX3).
Figure 13C:
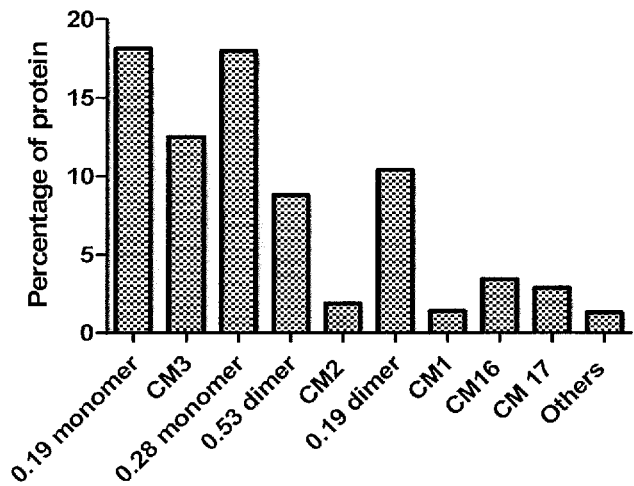
Figure 13D:
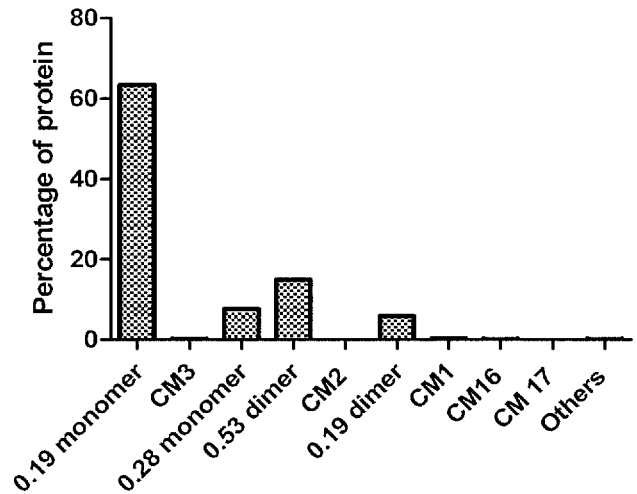
Figure 14:
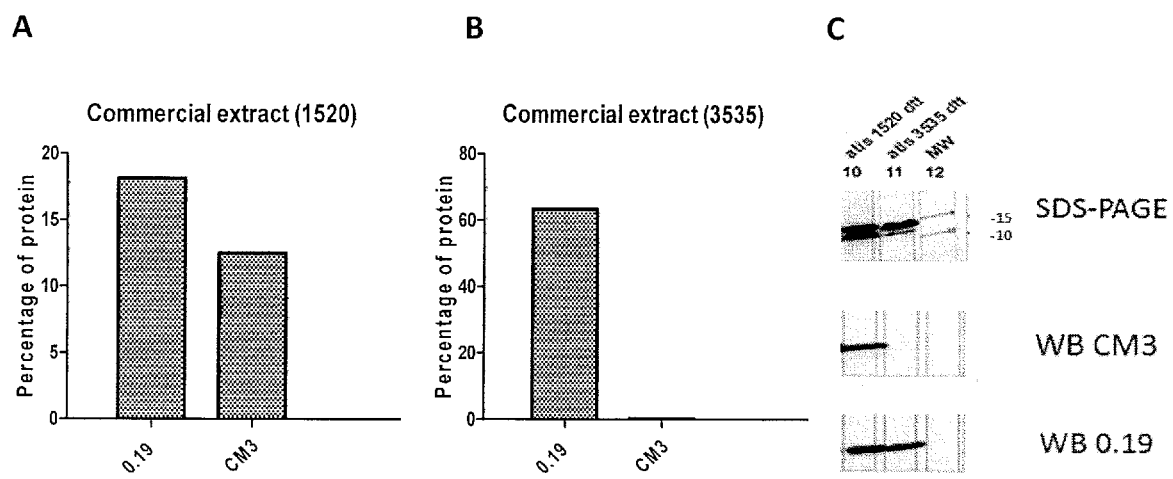
FIG. 14 shows relative quantity of the major ATI-species CM3 and 0.19 in different wheat extracts using mass spectrometry and Western blotting. (A and B): Determination of the percentage of CM3 and 0.19 relative to total protein in commercial extract 1520 and 3535 using mass spectrometry. (C): Reducing SDS PAGE gel (4-20% gradient) and Western-blotting using rabbit peptide antibodies specific for CM3 and 0.19, respectively.

This is preferentially performed in samples enriched in ATIs (quantitative extraction) and performed after proteolytic digest, using standard state of the art quantitatative MS techniques (Prandi B et al, Food Chem 2013). Liquid chromatography-mass spectrometry quantification of 4 different ATI isolates is shown in FIGS. 12-14.

Quantitative Western Blotting

This is performed after reconstitution in appropriate buffers and by using poly- or monoclonal antibodies directed either to total ATIs or to all or major ATI species. This works best without proteolytic digest.

High titer antibodies have been produced against a mixture of ATIs extracted from hexaploid wheat and against several antigenic epitopes of major ATIs such as CM3, CM16, 0.19 or 0.54. Examples of Western blot characterization are shown in FIG. 14C.

Up to 16 ATI species have been described in what based on genetic analysis. However, a subset of ATIs usually represent >90% of all ATIs. These are noncovalently linked tetrameric CM2, CM3, CM16, dimeric 0.19, 0.54, and monomers of e.g. 0.19 and 0.54 (Altenbach et al, BMC Res Notes 2011; Dupont et al, Proteome Sci 2011). Our data indicate that TLR4-stimulatory ability as highest for di- and tetrameric ATIs and lowest for monomeric ATIs. Quantification of the major 3-8 ATI species in a given wheat, rye, or barley variant will approximate total ATI quantification. If desired, also the minor species can be quantified.

ELISA or Similar Quantitative Assays

These work best both without and with (limited) proteolytic digest. They are based on monoclonal or polyclonal antibodies produced against antigenic (linear as well as structural epitopes of the major ATIs). In a classical ELISA variant, one of the antibodies is bound to a solid phase, the other is linked to a detection system, such as biotin, alkaline phosphatase, peroxidase, fluorescent, or luminescent indicators, and state-of the art detection systems. This also includes assays based on inhibition which require, e.g., a coated antibody and a labeled ATI standard to compete with ATIs in the unknown sample. Other state of the art assays such as radioimmunoassays (e.g., equilibrium or inhibition format) or bead assays can also be used, including quantification by multiplexed assays.

Notably, we observed that ELISA quantification of 2-3 of the major ATI species (CM3, CM2, 0.19, 0.28, and 0.53/0.54) correlates well with total ATI bioactivity in extracts of wheat and other bioactive ATI containing cereals and foods (data not shown).

Example 3—Methods to Prevent Correct Intramolecular Disulfide Formation in ATIs During Grain Growth or Filling The equilibrium between oxidized glutathione (GSSG) and protein bound glutathione (PSSG) shifts towards PSSG during the grain filling phase, e.g., the accumulation of storage proteins, mainly gluten (Bykova et al., Phytochem 2011; Ferreira et al, Plant Physiol Biochem 2012), prevents premature intra- and intermolecular disulfide bonding. Fixing the growing wheat plant in this redox state, characterized by PSSG will also prevent disulfide bonding within ATI molecules, and thus make the ATIs highly susceptible to denaturation and proteolytic degradation, either before or after further processing of the wheat flour. Similarly, excessive and continuous induction of the plant's early developmental thioredoxin enzymatic system, also in conjunction with enhancement of PSSG complex formation, will keep nascent ATI molecules in the non-disulfide linked state, making them susceptible to proteolytic digestion (Wong et al, Phytochem 2004; Wong et al, Plant Cell Physiol 2004). These measures will also make wheat (rye, baley) flour more susceptible to proteolytic digestion in the human body.

Methods to promote the formation of PSSG bonds are cultivation with excess GSH or GSSG, the cultivation with or induction of enzymes that decrease the plant's redox potential such as superoxide dismutase or catalase activities. An alternative strategy is modulation of sulphur supply to the growing wheat (rye, barley), e.g., via use of sulphur rich vs. sulphur depleted fertilizers, also in sequence. Thus under sulphur depletion, resultant flour proteins including ATIs are more fixed in their disulfide structures and less susceptible to proteolytic degradation by external proteases or proteases if the gastrointestinal tract (Reinbold et al, J Agricult Food Chem 2008), although ATI content is (slightly) decreased.

Example 4—Methods to Remove ATIs or Abolish ATI Bioactivity from Complex Foods by Thorough Extraction from, e.g., Wheat (Rye, Barley, or by Fermentation and their Ancestral Grains) Prior to Introduction into the Food Chain ATIs are quite resistant to degradation by many known proteases, including digestive enzymes of the human gastrointestinal tract such as pepsin, trypsin and chymotrypsin. Much of this resistance is due to the presence of several, usually five, intramolecular disulfide bonds that generate a compact secondary structure which is usually composed of four major alpha helices which are arranged up-and-down, securing a compact structure and hydrophobic interaction surfaces for di- and tetramerization (Oda et al, Biochemistry 1997). Useful methods to significantly decrease (>70%, preferably 80% and more) bioactive ATIs in e.g., flours are therefore based on 1) exhaustive extraction using preferably water based buffers, and 2) disulfide reduction which facilitates unfolding, eliminate bioactivity (i.e., activation of the TLR4-complex) and permit proteolytic digestion either before or during ingestion of the thus prepared foods. Proteolytic digestion of the reduced and unfolded ATIs can be achieved easily with common proteases used in the food industry, including e.g., pepsin at acidic pH, or e.g. trypsin, chymotrypsin or subtilisin at near neutral or alkaline pH. Enzymes that degrade unfolded or denatured ATIs are also produced during certain fermentation processes, as described below, including sourdough fermentation or reductive fermentation. This also includes fermentations that produce specific enzyme activities to cleave (unfolded, denatured) ATIs, including bacteria that have been engineered to produce such activity for the food industry.

Figure 5:
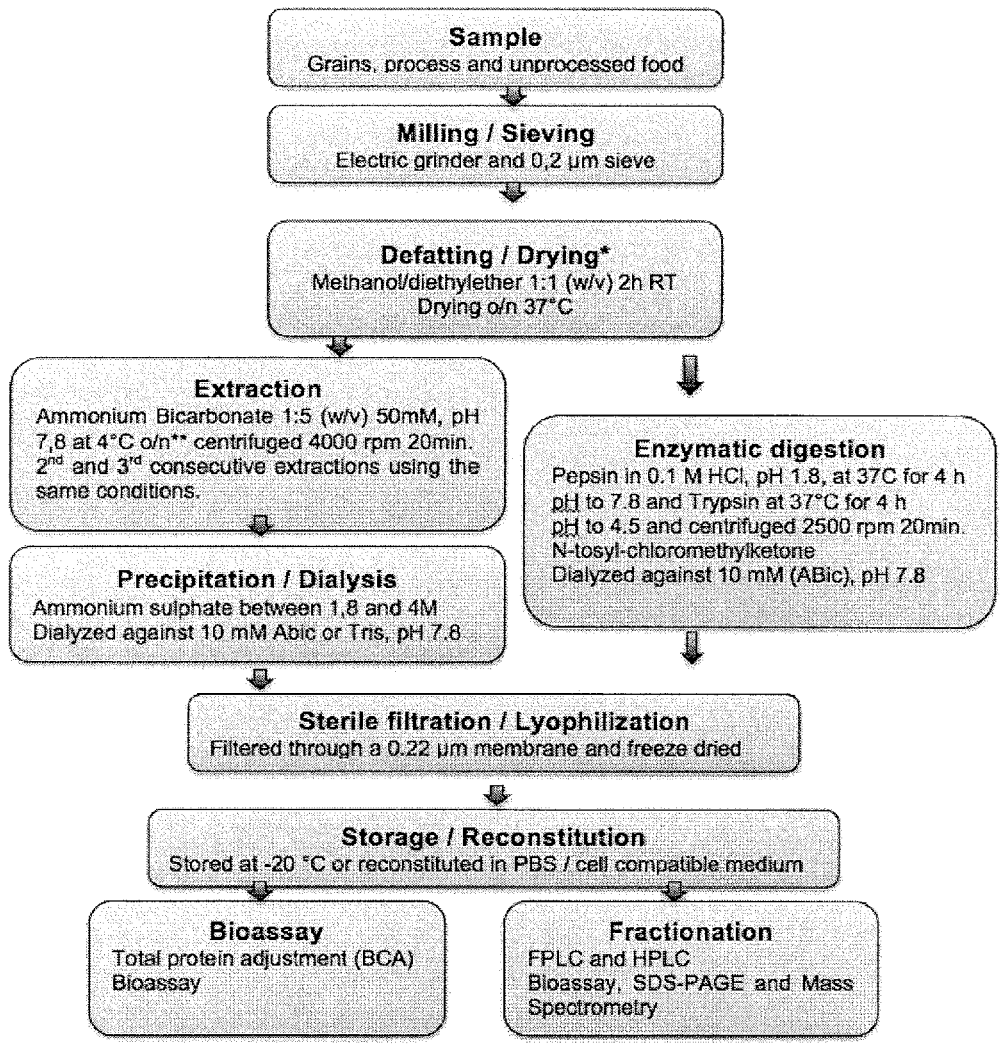
FIG. 5 shows simple method to extract ATIs from wheat (rye, barley) flour, their related products, and from other plant flours for determination of bioactivity. Extraction is incomplete using water, but improved and reproducible using buffered solutions containing low-intermediate concentrations of salt (preferably NaCl). Examples are phosphate buffered saline, pH 7.4, or 5-50 mM ammonium bicarbonate (Abic). Other concentrations of these chemicals in the solvents or related or unrelated chemicals with buffering properties can be also used, such as EDTA, EGTA, sodium bicarbonate, sodium carbonate, and various phosphate buffers. Dialysis of the extracts can be done against water, Abic solutions or acetic acid (AA). Compared to AA, Abic dialysis yields a higher ATI bioactivity in the cellular readout system. Bioactivity can be directly determined without defatting after two sequential extraction of, e.g., 1 h ($1^{st}$ and $2^{nd}$ extractions). Similarly, extractions for preparation of bulk ATI-de-enriched foodstuffs can be done with the latter or similar simplified methodologies.
Figures 11A, 11B:
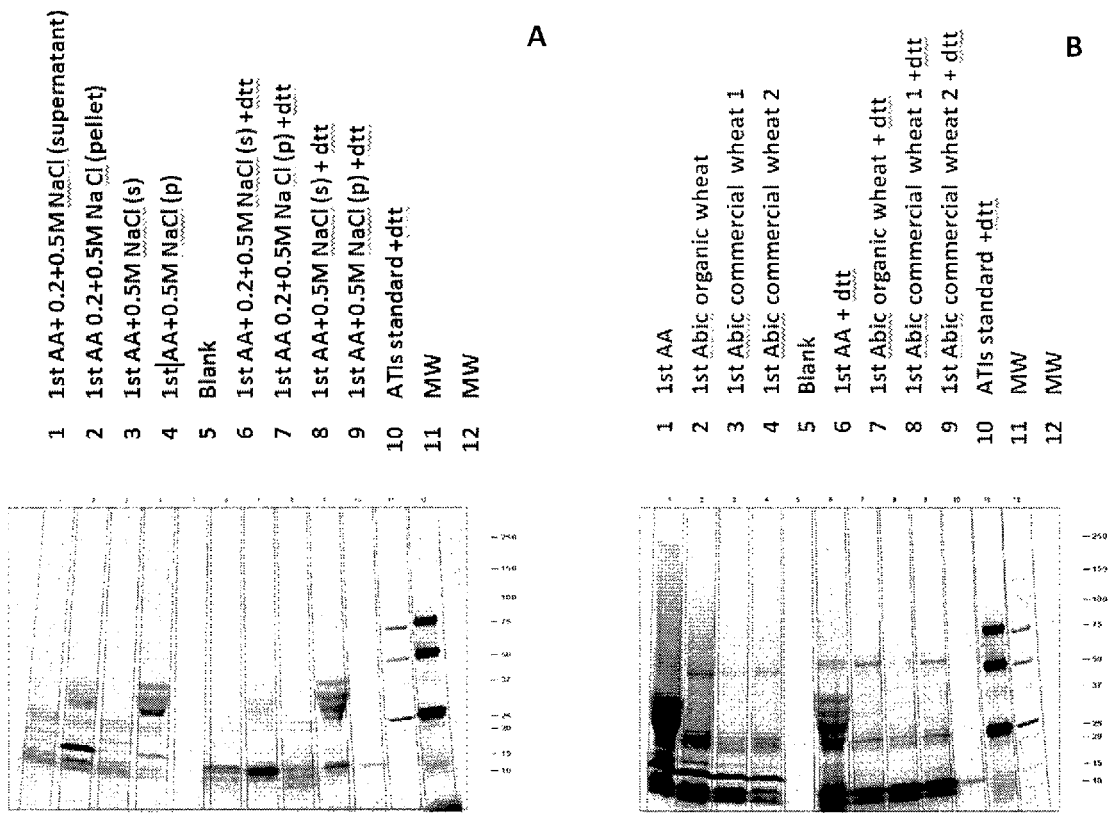
FIG. 11 shows ATIs in extracts from wheat flour on SDS PAGE gels (4-20% gradient). (A): Spring wheat extracted with acetic acid (AA) and subject to salting out using different concentrations of sodium chloride (NaCl). ATIs represent most of the band running in the 10-15 kD range. Supernatant (s) and pellet (p) were treated with a without a reducing agent (dithiothreitol, dtt). Notably, in the acidic range ATIs are prominently precipitating between at 0.2 M NaCl, while at 0.5M NaCl gluten will precipitate (bands above the 25 kD range). (B): Three different wheat samples extracted with ammonium bicarbonate (Abic) with or without reducing agent. Abic mostly extracts ATIs (prominent band(s) with molecular weight around 15 kDa) with only minor amounts of gluten and other proteins.

4.1 Chemical Methods (See Also FIGS. 5, 6, and 11)

Solvent Extraction of ATIs

ATIs can be extracted from flours and even processed foods using the methods described above (1.1.1 and 1.1.2). Extraction with water-based buffers is preferable due to low costs and lack of potential toxicity of residual solvent. The extracted flour (food) can be separated mechanically, e.g., by sedimentation or centrifugation, and then freeze-dried or (preferably) dried in air or other (inert) gases that permit drying of bulk quantities. Before drying the pellet, other steps, such as washes with water and/or with (organic) solvents that have a lower boiling point than water but bind residual water, such as acetone, ethanol, or similar solvents used in the food industry can be used for removal of traces of salt or acid (from the extraction buffer), and residual water. Residual water can also be retained when the extracted flour is frozen for storage and transport, or directly used for further food processing, such as fermentation or dough preparation.

Removal of 80-90% of bioactive ATIs can be reached with 1-2 extractions, as detailed in Example 1. This reduction would highly significantly reduce the risk of ATI-induced inflammation in the intestine and outside of the intestine in predisposed individuals, since nutritional ATI effects are dose dependent.

Chemical Reduction of Disulfides in ATIs.

These methods are similar to those detailed for analytical (quantitative) extraction of ATIs (described above). However, here the major aim is reductive inactivation of biologically active ATIs, in order to eliminate their TLR4 stimulatory activity, without toxicity to the consumer.

Example: Reductive Inactivation of ATIs.

100 g of the (dried) flour or food is incubated in neutral, near neutral, or alkaline solvents/buffers, such as water or saline with pH adjustment, or with PBS and a reducing agent, such as cysteine, or glutathione (GSH) balanced with oxidized glutathione (GSSG), at temperatures that can range between 4° C. and 100° C., for times that can range between one second and 24 hrs. Other usually mildly reducing agents that are known in the food industry can also be used. Reduced ATIs are preferably denatured at temperatures above 50° C. and can be locked in this denatured state by disulfide linkage with, e.g., cysteine or GSH, or via misfolded, newly generated, intra- and intermolecular disulfide bonds. Other free SH-group blocking agents used in the food industry can also be employed.

Fixation of partly reduced and thus severed intramolecular disulfides in ATIs can also be brought about during dough mixing by the addition of vitamin C or other pro-oxidative systems that generate, e.g., activated oxygen. This has been demonstrated for disulfides in glutenins (Koehler P et al, J Agricult Food Chem 2003a and b), but is also effective in ATIs.

4.2 Fermentation Strategies to Decrease Bioactive ATI in Foods Such as Flours

There are several fermentation methods that reduce ATI bioactivity, largely being based on non-reductive or reductive fermentation and/or proteolytic digestion of (disulfide reduced) ATIs.

Fermentation of wheat (rye, barley) dough with lactobacilli is used to enhance the degradation of gluten proteins under acidic conditions. Select lactobacilli that have an active thiol (disulfide reducing) metabolism are particularly suited to reduce and subsequently degrade ATIs proteolytically. An example are *Lactobacillus reuteri* and *L. sanfranciscensis* which efficiently deactivate proteins such as the highly disulfide linked ovotransferrin of wheat as well as ATIs. Proteolytic activity is mainly brought about by wheat aspartic acid proteases (Loponen et al, J Agricult Food Chem 2007; Loponen et al, J Agricult Food Chem 2008), but other proteolytic enzymes used in the food industry can be added. Fermentation of wheat flour and other ATI-containing flours can be done e.g. with varying proportions of rye malt in the dough, such as 5-20%. Here, apart from adding beneficial bacteria that are used in the food industry to prepare e.g. sourdough (*Lactobacillus* species), rye malt serves as source of proteolytic enzymes that were shown to degrade immunogenic gluten proteins (Loponen et al, J Agricult Food Chem 2007). This method can be combined with any of the other ATI-reducing methods described herein.

Figure 15A:
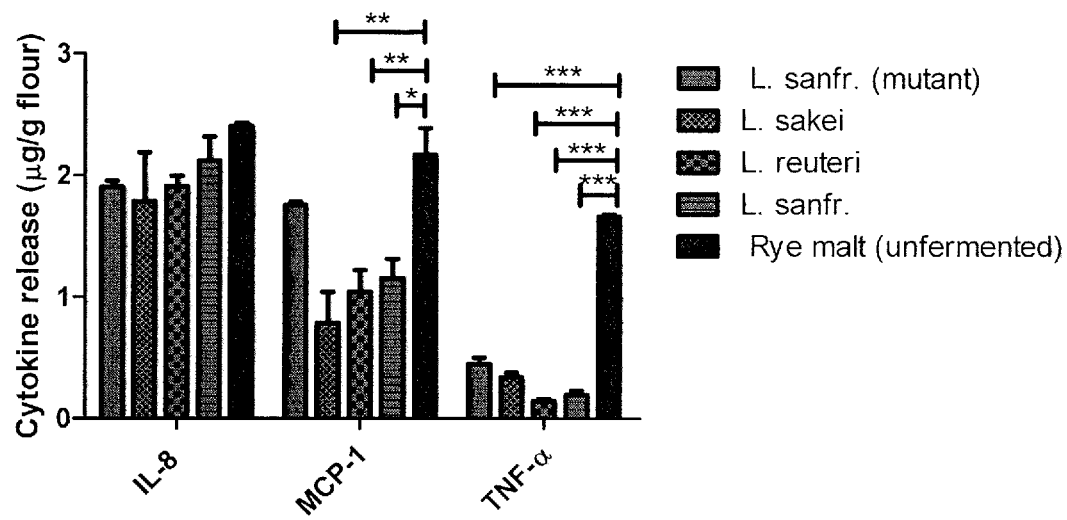
FIG. 15 shows ATI bioactivity of fermented wheat dough. (A): ATI bioactivity in 90% wheat dough fermented with 10% rye malt. Samples were extracted with Abic, lyophilized and reconstituted. Standardized extracts were cultured with the human monocytic cell line THP-1 and cytokines secreted (IL-8, MCP-1 and TNF-α) measured by ELISA. Bars in represent samples fermented with different strains (*Lactobacillus sanfranciscensis* (mutant), *L. Sakei*, *L. Reuteri* and *L. Sanfranciscensis*). Other bars represent a control sample of unfermented rye malt. Results are from 3-5 samples, and analysed for sugnificance using one way ANOVA and compared against the unfermented sample (control) using Dunnett's test. Level of significance (p<0.05) was represented by asterisks. *p<0.05, p<0.01, *p<0.005. (B): ATI bioactivity of fermented dough prepared with 100% whole wheat. Samples were extracted with Abic and analyzed as described above.
Figure 15B:
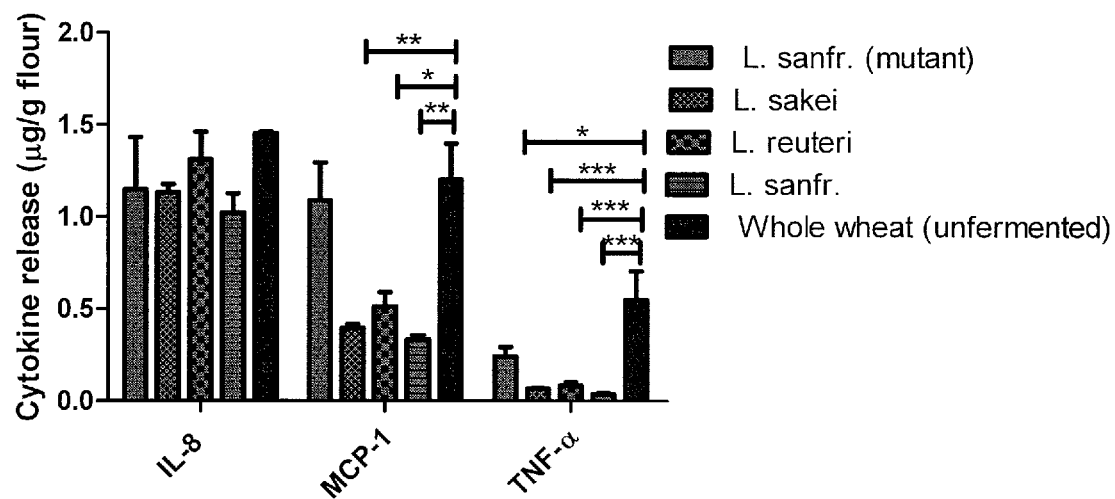
Figure 16:
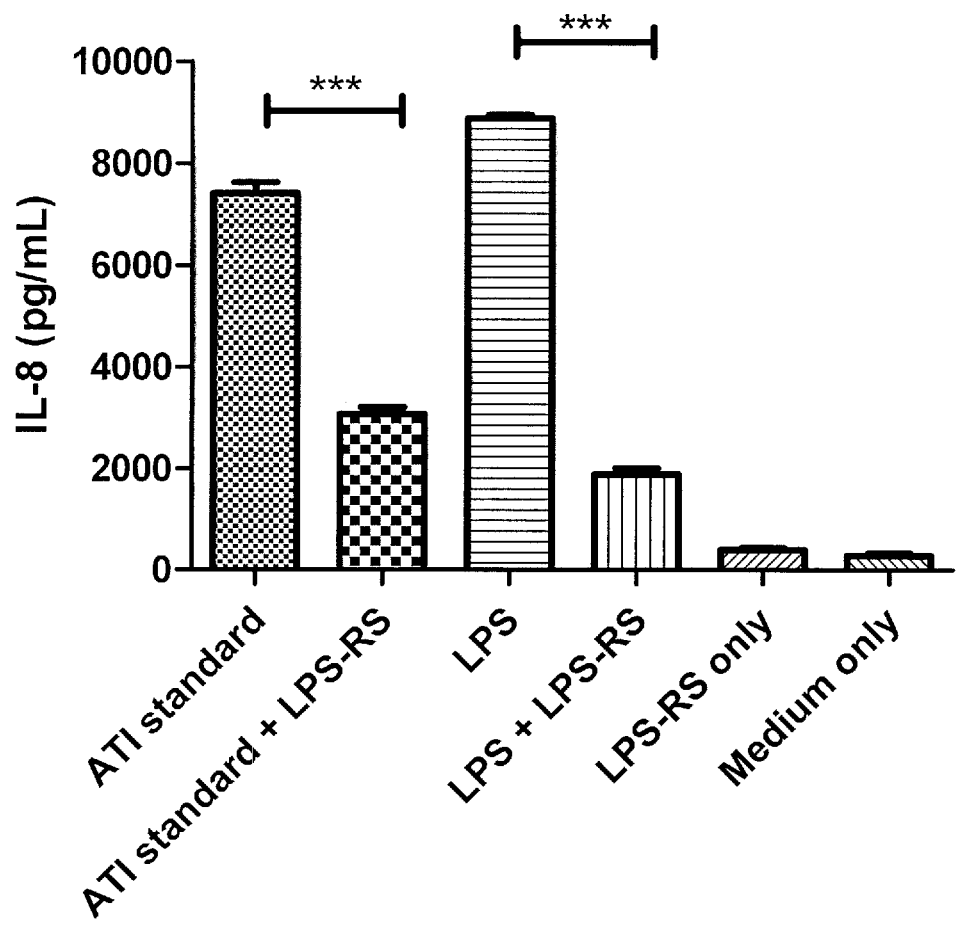
FIG. 16 shows inhibition of ATI-bioactivity using the natural TLR4-antagonist LPS-RS. TLR4-inhibitory lipopolysaccharide from *Rhodobacter sphaeroides* (LPS-RS, 1.5 μg/mL) was pre-incubated with THP-1 cells for 30 min, then ATIs enriched in CM3 and 0.19 (37.5 μg/mL) were added and cultured overnight. *E. coli* LPS (12.5 ng/mL) was also cultured overnight with THP-1 cells pre incubated (30 min) with LPS-RS (250 ng/mL). *E. coli* LPS (12.5 ng/mL), LPS-RS (1.5 μg/mL) or buffer alone served as controls.

Reduction of ATI Content by Non-Reductive and Reductive Fermentation of ATI-Containing Flours and Doughs The doughs can be prepared with whole wheat flour and without additives. Optimization is possible using refined instead of crude flours, or addition of common agents that are used in the food industry to improve fermentation or dough quality. An example is the addition of reducing agents, such as cysteine or glutathione, either before, during or after fermentation. Another alternative is the use of fermenting bacteria with high disulfide reducing ability. Such strains have been described and comprise, e.g., *Lactobacillus* sanfranciscensis and *L. reuteri* LTH2584. FIG. 15 shows the results of fermentation experiments (24 hrs) performed. ATI activity was determined in two sequential combined ammonium bicarbonate extractions from the fermented and then frozen doughs, using the methodology described above.

The following fermentation protocols were applied for 24 hrs at 37° C.:
i) chemically acidified control (low SH (sulfhydryl)-levels in dough, no reduction of disulfide bonds in proteins);
ii) *Lactobacillus sakei* (low SH);
iii) *Lactobacillus sanfranciscensis* (high SH-levels in dough and reduction of disulfide bonds in proteins owing to glutahione reductase activity);
iv) *Lactobacillus* sanfranciscensis delta gsrH (low SH-levels in dough as gene coding for glutathione reductase gene was disrupted);
v) *Lactobacillus reuteri* LTH2584 (high SH-levels owing to cystathionine gamma lyase);
vi) a second chemically acidified control to match the growth temperature of *L. reuteri*.

Controls for appropriate fermentation: Doughs were analysed with respect to pH, organic acid levels and SH-groups, as were the numbers of fermenting bacteria. The data demonstrate an up to ~50-60% reduction in ATI-bioactivity in the sourdoughs that were fermented with Lactobacilli in general, either with or without rye malt addition. This indicates significant proteolytic digestion and thus inactivation of ATIs by fermentation in general, without higher degradation activity by disulfide reducing strains.

Notably, an advantage of the thiol-reducing bacteria (*L. sanfranciscensis* and *L. reuteri*) is likely. In a preliminary experiment, post fermentation heating of the dough to elevated temperatures that do not yet inactivate the rye (barley) malt or *Lactobacillus*-derived proteolytic enzymes (time up to 2 hrs) could further reduce ATI bioactivity down to 20% in the doughs subject to thiol reducing Lactobacilli vs. 30% in the non-thiol-reducing bacteria, indicating an advantage of the former strains. This was accompanied by a comparable reduction of major ATI-bands CM3 and 0.19 in a Western blot using our polyclonal antibodies specific for these protein. Overall, reductive fermentation more than conventional fermentation leads to disulfide reduction of ATIs which then become susceptible to proteolytic degradation by enzymes used in the food industry, such as those produced by Lactobacillae or that are present in malt.

Example 5—TLR4 Antagonistic Compounds that can be Added to ATI Containing Foods

There are several (weak to moderately active) oral TLR4 antagonists, many of them of herbal origin, with long-term use as spices or food additives. These are e.g. alkaloids, aromatic compounds, polyphenols, peptides or proteins (Rossignal and Lynn 2005; Lucas and Maes, Mol Neurobiol 2013). Examples include, but are not limited to, *Bartonella quintana* lipopolysaccharide (Popa et al, Infect Immunol 2007); extracts of leaves from Clerodendrum (Kouakou et al, BMC Complement Altern Med 2013); cinnamon extract and its active components (Kanuri et al, J Nutr 2009); eritoran mimicking the MD component of the TLR4-MD2-CD14 complex, formulated to be resistant to gastric or intestinal hydrolysis (Shirey et al, Nature 2013); epigallocatechin-3-gallate from, e.g., green tea (Hong et al, J Immunol 2010; Bao et al, Mol Nutr Food Res 2013); 6-shogaol and 1-dehydro-10-gingerdione (1D10G) from Ginger (Ahn et al, Mol Cless 2009; Park et al, Biochem Biophys Res Communic 2012); Melatonin (Hu et al, Pinela Res 2013); Berberin as TLR4-NFkB pathway inhibitor (Li et al, Acta Pharmacol Sin 2012); Lipopolysaccharide from the photosynthetic bacterium *Rhodobacter sphaeroides* (LPS-RS) (Rallabhandi et al, Coats et al, J Immunol 2005); and Lipopolysaccharide from *Porphyromonas gingivalis* (Coats et al, J Immunol 2005; Curtis et al, Infect Immunol 2011)

Adding these compounds or compound mixtures with proven TLR4 antagonistic activity to ATI-containing foods will antagonize the TLR4-activating activity of ATIs, without need of prior extraction or inactivation. This should be relevant to either completely avoid these prior inactivation or extraction steps, or to "neutralize" residual ATI activity after these steps. We could demonstrate that this neutralization of ATI-induced innate immune activation by using the natural TLR4-antagonist from the photosynthetic bacterium *Rhodobacter sphaeroides* (LPS-RS) (Rallabhandi et al, J Immunol 2005) (FIG. 16).

Other Embodiments

All publications, patents, and patent applications mentioned in the above specification are hereby incorporated by reference to the same extent as if each individual publication, patent or patent application was specifically and individually indicated to be incorporated by reference in its entirety. Various modifications and variations of the described devices and methods of the invention will be apparent to those skilled in the art without departing from the scope and spirit of the invention. Although the invention has been described in connection with specific embodiments, it will be understood that it is capable of further modifications and that the invention as claimed should not be unduly limited to such specific embodiments. Indeed, various modifications of the described modes for carrying out the invention that are obvious to those skilled in the art are intended to be within the scope of the invention. This application is intended to cover any variations, uses, or adaptations of the invention following, in general, the principles of the invention and including such departures from the present disclosure come within known customary practice within the art to which the invention pertains and may be applied to the essential features herein before set forth.

Other embodiments are within the following claims.

The invention claimed is:

1. A method of reducing amylase/trypsin inhibitor (ATI) content and ATI bioactivity from wheat or cereal, said method comprising:

(a) selecting a wheat or a cereal that expresses low levels of ATIs by measuring ATI content and measuring ATI bioactivity by quantifying a level of toll-like receptor 4 (TLR4) activation stimulated by the wheat or cereal;

(b) incubating said wheat or cereal in a mixture comprising the wheat or cereal and an ATI extraction buffer for a duration sufficient to reduce the ATI content and ATI bioactivity of said wheat or cereal by at least 50% relative to the wheat or cereal not exposed to said extraction buffer, followed by removing said extraction buffer from said wheat or cereal, thereby producing an ATI-reduced wheat or cereal;

(c) determining the ATI bioactivity in the ATI-reduced wheat or cereal by detecting and quantifying a level of TLR4 activation stimulated by the ATI-reduced wheat or cereal; and (d) preparing a foodstuff from the ATI-reduced wheat or cereal determined in step (c) to have reduced ATI bioactivity relative to the wheat or cereal prior to step (a).

2. The method of claim 1, wherein the method further comprises one or more of the following:

(i) reducing the amount of the ATI in the wheat or cereal by extracting and degrading the ATI using one or more reducing agents, proteases, and/or synthetic enzymes engineered to reduce and/or degrade the ATI in the wheat or cereal; and/or (ii) fermenting said wheat or cereal with a bacterium with high disulfide reducing and/or proteolytic activity.

3. The method of claim 2, wherein the bacterium is *Lactobacillus sanfranciscensis* or *L. reuteri* LTH2584.

4. The method of claim 1, wherein:

(i) prior to inclusion in the foodstuff, the wheat or cereal is produced by cultivating the wheat or cereal with:

(a) oxidized glutathione (GSSG) and/or protein bound glutathione (PSSG); or (b) sulfur rich or sulfur depleted fertilizers that reduce the bioactivity of ATI; and/or (ii) the method further comprises one or more of the following:

(a) grinding the wheat or cereal to produce a flour prior to incubating the wheat or cereal in the extraction buffer and, optionally, drying the flour, (b) following the incubation, centrifuging the flour of the wheat or cereal to form a pellet and a supernatant, and removing the supernatant containing extracted ATIs, (c) drying the pellet to form an extracted flour, (d) preparing a dough with the extracted flour; and/or (e) fermenting the dough with a bacterium with high disulfide reducing ability and/or proteolytic activity.

5. The method of claim 4, wherein said wheat is selected from the group consisting of spelt, emmer, and einkorn or said cereal is selected from the group consisting of barley and rye.

6. The method of claim 4, wherein said bacterium is *Lactobacillus sanfranciscensis* or *L. reuteri* LTH258.

7. The method of claim 1, wherein:

(i) the extraction buffer is a neutral, near neutral, or alkaline solvent or buffer; and/or (ii) said wheat or cereal:

(a) is unprocessed prior to extraction;

(b) is a processed wheat or cereal; and/or (c) is ground or defatted prior to incubating the wheat or cereal with the extraction buffer, wherein, optionally, the defatting is performed by incubation of the wheat or cereal with methanol/diethylether at a 1:1 ratio.

8. The method of claim 7, wherein the extraction buffer:

(a) comprises phosphate buffered saline (PBS), Tris-buffer, water, or ammonium or sodium bicarbonate;

(b) comprises up to 1.0 molar sodium chloride;

(c) comprises a detergent or mixture of detergents;

(d) comprises a reducing agent;

(e) comprises an alkylating agent that can be quenched by addition of excess reducing agent;

(f) is at a concentration between 5 mM to 100 mM; and/or (g) comprises a protease and/or a synthetic enzyme engineered to reduce and/or degrade ATIs.

9. The method of claim 8, wherein:

(i) the detergent is selected from the group consisting of sodium dodecyl sulfate, Triton X-100, Tween-20, and sodium deoxycholate;

(ii) the reducing agent is selected from the group consisting of mercaptoethanol, dithioerythritol (DTE), cysteine, glutathione (GSH) balanced with oxidized glutathione (GSSG), sulfite, and thioredoxin;

(iii) the alkylating agent is iodoacetamide; and/or (iv) the protease is pepsin, trypsin, chymotrypsin, elastase, thermolysin, bromelain, papain, subtilisin, an alkaline protease, a neutral protease, an acidic protease, a fungal protease, a yeast protease, or a bacterial protease.

10. The method of claim 9, wherein the wheat or cereal is first digested with pepsin followed by digestion with trypsin and/or chymotrypsin, and/or a synthetic enzyme engineered to reduce and/or degrade ATIs.

11. The method of claim 4, wherein:
(i) the drying is air-drying or freeze drying; and/or
(ii) prior to the drying, the mechanically separated wheat or cereal is contacted with an aqueous solvent or an organic solvent having a lower boiling point than water.

12. The method of claim 2, wherein, after the wheat or cereal is digested with the protease, the wheat or cereal is centrifuged to form a supernatant.

13. The method of claim 1, wherein the method further comprises:
(i) determining the ATI content of the wheat or cereal by quantifying the ATIs removed by the extraction buffer from step (b) by performing an enzyme linked immunosorbent assay (ELISA); wherein, optionally, the ATI is detected using an antibody that recognizes and binds to at least one ATI selected from the group consisting of CM2, CM3, CM16, CM17, 0.19, 0.28, and 0.53/0.54; and/or
(ii) incubating ATI-reactive cells with the removed extraction buffer from step (b).

14. The method of 13, wherein:
(i) the ATI-reactive cells express TLR4, TLR4-MD2, or TLR4-MD2-CD14 signaling complex;
(ii) the ATI-reactive cells are selected from the group consisting of monocytes, macrophages, and dendritic cells;
(iii) the ATI-reactive cells are transfected with a TLR4, TLR4-MD2, or TLR4-MD2-CD14 oligomeric signaling complex;
(iv) the ATI-reactive cells are stable cell lines selected from the group consisting of THP, U937, HEK, and HeLa cells;
(v) the determination of ATI-response comprises quantification of one or more cytokines selected from the group consisting of IL-8, IL-15, TNFa, CCL2 (MCP-1), and CCL5 (RANTES) released by the ATI-reactive cells; and/or
(vi) the ATI-reactive cells comprise a reporter gene under the control of a TLR4 (ATI)-responsive promotor and the determination of an ATI-response comprises detection of expression of the reporter gene.

15. The method of claim 13, wherein:
(i) the ELISA comprises incubating an immobilized TLR4, TLR4-MD2, or TLR4-MD2-CD14 with the extract suspected of comprising ATIs, wherein the immobilized TLR4, TLR4-MD2, or TLR4-MD2-CD14 is immobilized to a solid phase and bound to a labeled ATI, removing the extract, and determining the amount of labeled ATI in the extract by determining the amount of labeled ATI in the mixture that binds to the immobilized TLR4, TLR4-MD2, or TLR4-MD2-CD14 that is immobilized to the solid phase, wherein, optionally, the labeled ATI is labeled with a fluorophore or an enzyme selected from the group consisting of horseradish peroxidase or alkaline phosphatase;
(ii) the ELISA comprises incubating an immobilized TLR4, TLR4-MD2, or TLR4-MD2-CD14 with the extract suspected of comprising ATIs, removing the extract suspected of comprising ATIs, and determining the amount of ATIs that are bound to the immobilized TLR4 using an antibody in an ELISA, wherein optionally the antibody recognizes and binds to at least one ATI selected from the group consisting of CM3, CM2, CM16, CM17, 0.19, 0.28, and 0.53/0.54; and/or
(iii) the antibody capable of binding to the at least one ATI is a monoclonal or polyclonal antibody.

16. The method of claim 14, wherein:
(i) the ATI-responsive promoter is the IL-8 promoter;
(ii) the reporter gene encodes a luminescent or fluorescent protein; and/or
(iii) the determination of ATI-response comprises:
(a) measuring a level of one or more RNAs that correspond to cytokines/chemokines Hsp27, Hsp70, and/or Hsp90 in the cells that are associated with an ATI-response,
(b) detecting one or more activation markers selected from the group consisting of CD80, CD86, MHC class II, IL-12, IL 23, and interferon gamma (release or intracellular stain) on or in the cells;
(c) detecting an alteration in a signaling pathway associated with an ATI response; and/or
(d) contacting ovalbumin or gluten specific T cells in the presence of the removed extraction buffer and measuring the proliferation of the cells in the presence of ATI-reactive antigen presenting cells.

17. The method of claim 16, wherein:
(i) the detecting comprises flow-cytometry; and/or
(ii) the alteration in the signaling pathway is determined by detecting IRF-3, NFkB (p65), or NFkB nuclear translocation.

18. The method of claim 13, wherein the extraction buffer:
(i) is a neutral, near neutral, or an alkaline solvent or buffer;
(ii) comprises PBS, Tris-buffer, or ammonium or sodium bicarbonate;
(iii) further comprises up to 1.0 M sodium chloride;
(iv) further comprises a detergent or mixture of detergents comprising sodium dodecyl sulfate, Triton X-100, Tween-20, and/or sodium deoxycholate;
(v) further comprises a reducing agent; and/or
(vi) further comprises an alkylating agent.

19. The method of claim 18, wherein:
(i) the reducing agent is selected from the group consisting of mercaptoethanol, dithioerythritol (DTT), cysteine, glutathione (GSH) balanced with oxidized glutathione (GSSG), sulfite, and thioredoxin; and/or
(ii) the alkylating agent is iodoacetamide that can be quenched by addition of excess reducing agent.

20. The method of claim 1, wherein the ATIs are quantified by bioactivity using TLR4 expressing cells, mass spectrometry, quantitative western blotting, or ELISA.

21. The method of claim 8, wherein the protease is a serine protease.

* * * * *

UNITED STATES PATENT AND TRADEMARK OFFICE
CERTIFICATE OF CORRECTION

PATENT NO. : 11,291,221 B2
APPLICATION NO. : 15/771798
DATED : April 5, 2022
INVENTOR(S) : Detlef Schuppan et al.

It is certified that error appears in the above-identified patent and that said Letters Patent is hereby corrected as shown below:

In the Claims

Column 23, Line 43, replace "TNFa" with --TNFα--;
Line 44, replace "CCLS" with --CCL5--.

Signed and Sealed this
Eleventh Day of October, 2022

Katherine Kelly Vidal
Director of the United States Patent and Trademark Office